(12) United States Patent
Sherman

(10) Patent No.: US 6,653,356 B2
(45) Date of Patent: Nov. 25, 2003

(54) NANOPARTICULATE TITANIUM DIOXIDE COATINGS, AND PROCESSES FOR THE PRODUCTION AND USE THEREOF

(76) Inventor: Jonathan Sherman, PMB 113, 2000 Mallory La., Suite 130, Franklin, TN (US) 37067

( * ) Notice: Subject to any disclaimer, the term of this patent is extended or adjusted under 35 U.S.C. 154(b) by 9 days.

(21) Appl. No.: 09/736,738

(22) Filed: Dec. 13, 2000

(65) Prior Publication Data

US 2002/0005145 A1 Jan. 17, 2002

Related U.S. Application Data

(60) Provisional application No. 60/216,937, filed on Jul. 10, 2000, provisional application No. 60/202,033, filed on May 5, 2000, provisional application No. 60/188,761, filed on Mar. 13, 2000, and provisional application No. 60/170,509, filed on Dec. 13, 1999.

(51) Int. Cl.$^7$ ............................................. C01G 23/047
(52) U.S. Cl. ........................ 516/90; 423/610; 423/615; 423/616
(58) Field of Search ...................... 516/33, 90; 106/436; 423/610, 615, 616

(56) References Cited

U.S. PATENT DOCUMENTS 5,451,252 A * 9/1995 Elfenthal et al. ............ 423/266
5,840,111 A * 11/1998 Wiederhoft et al. ......... 423/610

* cited by examiner

*Primary Examiner*—Steven Bos
(74) *Attorney, Agent, or Firm*—Fuess & Davidenas

(57) ABSTRACT

Nanoparticulate titanium dioxide coating produced by educing flocculates of titanium dioxide nanoparticles from a titanyl sulfate solution and dispersing the nanoparticles in a polar sol-forming medium to make a sol suitable as a coating usable to impart photocatalytic activity, U.V. screening properties, and fire retardency to particles and to surfaces. The photocatalytic material and activity is preferably localized in dispersed concentrated nanoparticles, spots or islands both to save costs and leverage anti-microbial effects.

4 Claims, 6 Drawing Sheets

NANOPARTICULATE TITANIUM DIOXIDE COATINGS, AND PROCESSES FOR THE PRODUCTION AND USE THEREOF

RELATION TO PREDECESSOR PROVISIONAL PATENT APPLICATIONS

The present patent application is descended from, and claims benefit of priority of, U.S. provisional patent applications serial nos. 60/216,937 filed on Jul. 10, 2000, for NANOPARTICULATE TITANIUM DIOXIDE COATINGS AND PROCESS FOR THE PRODUCTION THEREOF AND USE THEREOF; 60/202,033 filed on May 5, 2000 for ANTIFOULING PHOTOACTIVE AGGREGATES; 60/188,761 filed on Mar. 13, 2000, for PHOTOACTIVE ANTIFOULANT AGGREGATES; and 60/170,509 filed on Dec. 13, 1999, for PREPARATION OF COMPOSITE PHOTOCATALYTIC PARTICLES. All predecessor provisional patent applications are to the selfsame inventor as the present patent application.

BACKGROUND OF THE INVENTION

1. Field of the Invention

The present invention generally concerns photocatalytic particles and aggregates and coatings, especially as may incorporate nanoparticulate titanium dioxide, and to processes for the production and the use thereof.

The present invention further generally concerns photocatalytic materials as are effective for, inter alia, killing microorganisms, including algae and bacteria, on contact in the presence of light in the visible or ultraviolet wavelengths. More particularly as regards these photocatalytic materials, the present invention concerns (1) composite photocatalytic materials in the form of particles and other bodies with surfaces which particles and bodies have (1a) cores nondeleterious to photocatalytic action coupled with (1b) photocatalytic surfaces; and (2) liquids, aggregates and solids incorporating such (1) photocatalytic materials.

2. Description of the Prior Art 2.1 Photocatalytic Coatings, Especially as May Incorporate Nanoparticulate Titanium Dioxide A first aspect of the present invention will be seen to concern the production, and use, of photocatalytic coatings, especially as may incorporate nanoparticulate titanium dioxide.

For the purposes of the present invention, nanoparticulate titanium dioxide coating ("nano-coating") is taken to be surface coatings of rutiles, anatases and amorphous titanium dioxide having a particle size of 1 to 100 nm, preferably of 1 to 50 nm, and more preferably of 1 to 10 nm, or titanium dioxide having the above-stated particle size dispersed and adhering on a surface.

2.1.1 Applications for Titanium Dioxide Nano-coatings

Applications for such titanium dioxide nano-coatings include the following. Pigmentary particles may be coated with titanium dioxide to impart improved U.V. absorption or opalescent effects. In this application the light transparency of the titanium dioxide due to the small particle size is a particularly desirable characteristic of the nano-coating.

Titanium dioxide nano-coatings may be applied to building materials as a photocatalytic coating providing antifouling benefits. Photocatalytic surfaces so created are particularly useful in public areas such as rest rooms and hospitals to reduce bacterial contamination.

A titanium dioxide nano-coating may be applied as a photocatalytic coating to a waste water treatment apparatus.

A titanium dioxide nano-coating may be applied to both powders and continuous surfaces as a coating for absorption of U.V. radiation, A titanium dioxide nano-coating may be applied to a surface as a flame retardant surface.

A titanium dioxide nano-coating may be applied to a surface as a support layer in a dye solar cell.

The use of titanium dioxide nano-coatings is, however, currently still restricted by the fact no economic process is known which is capable of producing nano-coatings comprised of the stated particle size on an industrial scale. The present invention deals with this issue.

2.1.2 Sol/gel Coatings of Nano-particulate $TiO_2$

The most important previous methods for the formulation of nano-particulate $TiO_2$ coatings—also known as titanium dioxide nano-coatings—may be grouped together under the superordinate term of "sol/gel coatings". Sol/gel coatings have been described in many journal articles and patents. Nano-particles of $TiO_2$ in the sol/gel form are attracted to surfaces by van der Waals' forces and may be further anchored to surfaces by stronger chemical bonds 1% such as fusion bonds.

Sol/gel materials are desirable because, when applied as a film to surfaces, these nano-particulate suspensions create the thinnest surface coatings, disperse evenly, and have good adhesion properties.

As discussed in U.S. Pat. No. 5,840,111, the sol/gel coatings are generally formulated using the alkoxide method, i.e. the carefully controlled, frequently base- or acid-catalyzed hydrolysis of metal alkoxides and similar molecular precursors in mixtures of water and one or more organic solvents. The solvent used is generally the same alcohol as is the basis of the alkoxide. One disadvantage of this previous process is that costly educts and complicated processing are required. Moreover, the products have an undesirably elevated carbon content.

Originally developed for silicon compounds, the alkoxide method is increasingly also being used for the synthesis of nano-titanium dioxide in accordance with the equation

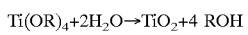

$Ti(OR)_4 + 2H_2O \rightarrow TiO_2 + 4\ ROH$

See, for example, J. Livage, *Mat. Sci. Forum* 152–153 (1994), 43–54; J. L. Look and C. F. Zukoski, *J. Am. Ceram. Soc.* 75 (1992), 1587–1595; WO 93/05875.

It is frequently possible to produce monodisperse particles, i.e. particles having a very narrow particle size distribution, by appropriate selection of the reaction conditions, permitting production of homogeneous particles ranging in diameter from some micrometers down to a few nanometers. One example of such a special processing method is working in microemulsions, by which means it is possible to limit particle size. See, for example, D. Papoutsi et al., *Langmuir* 10 (1994), 1684–1689.

The educts for virtually all sol/gel reactions for the production of $TiO_2$ nano-coatings, whether by conventional or microemulsion methods, are titanium alkoxides (Ti(OR)$_4$), the alkyl residues R of which conventionally contain 2 to 4 carbon atoms. However, due to the high price of these alkoxides and particular handling requirements (protective gas, strict exclusion of moisture in order to prevent premature hydrolysis), the stated reactions have not been considered for a large scale industrial process.

Still furthermore, working in microemulsions has the disadvantage that, due to the frequently low concentration of the reactants, (i) the space/time yield is low and (ii) large quantities of water/solvent/surfactant mixtures are produced which must be disposed of.

An alternative, a non-hydrolytic sol/gel manufacturing process has recently been proposed which involves reacting metal halides with oxygen donors such as ethers or alkoxides. See S. Acosta et al., *Better Ceramics through Chemistry VI* (1994), 43–54.

2.1.3 Chemical Vapor Reaction Processes for the Production of $TiO_2$ as May be Used in Nano-Coatings Yet another group of methods for the production of ultra-fine titanium dioxide particles comprises the so-called CVR (chemical vapor reaction) processes, which are based upon the reaction of vaporizable metal compounds (generally alkoxides) with oxygen (air) or steam in the gas phase. This process is described, for example, in U.S. Pat. No. 4,842,832 and Europe patent no. EP-A 214 308. While small quantities of powders produced using such processes are presently (circa 2000) commercially available, they are extremely expensive.

2.1.4 Industrial Processes Producing $TiO_2$ Undesirably Coarse for Use in Nano-Coatings Of the hitherto known processes performed on a large industrial scale for the production of finely divided (sub-pigmentary) titanium dioxide, none yields a product comparable in terms of fineness and transparency with sol/gel materials. These industrial processes include hydrolysis of $TiCl_4$ as is shown in Great Britain patent no. GB-A 2 205 288; production of rutile nuclei in the sulfate process as is shown in Europe patents nos. EP-A 444 798 and EP-A 499 863; and peptisation with monobasic acids of titanium dioxide hydrate which has been washed free of sulfate as is shown in Europe patent no. EP-A 261 560 and also in U.S. Pat. No. 2,448,683.

It is also known from U.S. Pat. No. 5,840,111 to react a solution comprising sulfuric-acid and titanyl sulfate by adding an alkaline-reacting liquid such that the alkaline liquid is present in a stoichiometric deficit relative to the "free sulfuric acid" (which is the total sulfur content minus that proportion bound in the form of foreign metal sulfates). The resultant solution is then flocculated by adding a monobasic acid. This process is inefficient because a significant portion, approximately 50%, of the titanyl sulfate does not react acidically with the stoichiometrically deficient alkaline liquid so that a significant portion, approximately 50%, of the potential $TiO_2$ product is left in solution in the form of titanyl sulfate.

It is also known from the literature to hydrolyse $TiCl_4$ under hydrothermal conditions, wherein depending upon the reaction conditions (concentration, temperature, pH value, mineralisers), nano-anatases and nano-rutiles are obtained. See H. Cheng et al., *Chem. Mater.* 7 (1995), 663–671. However, due to the complicated processing requirements, it is doubtful that a commercially viable product may be obtained using this method.

2.1.5 Objects of the Present Invention as Regards the Production and Use of Coatings, Particularly Nanoparticulate Titanium Dioxide Coatings It is thus a primary object of the invention to produce at high yield a well-adhering thin, uniform, transparent titanium dioxide nano-coating—in which nano-coating is present titania nanoparticles—and to provide a process for the application thereof. The processes for each of (1) the production and (2) the application of nano-titanium dioxide coatings should be economically viable, and would preferably entail only relatively simple and foolproof conventional processing requirements that, when conducted at an industrial large scale, will reliably produce a titanium dioxide nano-coating product fully having the most favorable thinness, uniformity, and adhesion properties of the best sol/gel films.

2.2 Prior Art Regarding the Application of Photocatalytic Coatings

The previous sections 2.1 have discussed prior art, and the deficiencies of the prior art, in the economical industrial scale production of photocatalytic coatings particularly including titanium dioxide nano-coating. As might be expected, the present invention will teach a solution to this production problem.

However, the present invention extends further, it having been recognized that photocatalytic coatings—howsoever inexpensively obtained—may be beneficially applied in a manner distinguished over the prior art.

The prior art for the application of photocatalytic coatings of any type basically shows a substantially even, uniform and homogeneous application of these coatings, mostly in the form of solutions that are applied to surfaces in the manner of paint. The present invention will soon be seen to teach otherwise, and to teach that photocatalytic materials are usefully unevenly applied so as to create "hot spots" of photocatalytic activity, even if and when the "hot spots" are quite small, having dimensions on the order of molecules, and occasionally widely dispersed.

2.2 Prior Art Regarding the Direct Incorporation of Photocatalytic Materials In Other Materials for Anti-fouling Purposes Photocatalytic titanium oxides have been the focus of several efforts to introduce antifouling properties to coatings and masonry. Examples include Japanese Patent 11 228 204 "Cement composition containing photocatalyst and construction method using it"; Japanese Patent 11 061 042 "Highly hydrophilic inorganic coatings, coated products therefrom and their uses"; and European Patent EP-A885 857 "Use of a mixture of organic additives for the preparation of cementitious compositions with constant color, and dry premixes and cementitious compositions containing the mixture". Wide-spread commercial use has been limited largely due to the relatively high cost and poor dispersion characteristics of commercially available photocatalytic titanium oxide powders. Using photocatalytic titanium oxide is attractive for an anti-fouling product because titanium oxides exhibit robust weatherability and low toxicity. The anatase crystalline form of titanium dioxide exhibits high photocatalytic activity and has been the most widely explored. A problem has been to introduce enough anatase titanium dioxide into the coating or surface formulation to impart anti-fouling properties while maintaining an economic advantage over commercially available leaching-type biocides.

While prior art techniques attempt to minimize cost barriers, they are deficient in one or more areas. For example, extenders have been added to paint formulations to space photocatalyst particles to preserve photocatalytic efficiency, however, these extenders are difficult to distribute within the paint matrix to maximize photocatalytic efficiency. Extenders are typically larger particles and/or in the form of aggregates and thus tend to increase the effective photocatalyst volume concentration and decrease photoactive efficiency as they are added to replace paint resin content, a phenomena analogous to decreasing scattering efficiency as described in F. Stieg, "The Effect of Extenders on the Hiding Power of Titanium Pigments", *Official Digest*, 1959, pp. 52–64.

Titanium oxide particles, especially anatase titanium dioxide, are difficult to distribute evenly in coating formulations. Anatase titanium dioxide preferentially agglomerates due to a relatively large Hamaker constant ($6 \times 10^{-20}$ J) that causes individual photocatalyzing particles to clump and effectively shade each other, reducing photocatalytic efficiency. It would be desirable for photocatalytic particles to disperse more easily in slurries and coating formulations.

A common strategy for improving the dispersion of pigmentary titanium dioxide is to prepare a composite pigment. U.S. Pat. No. 5,755,870 to Ravishankar provides a review of such strategies the teachings of which are incorporated herein by reference. However, the composite pigments described do not attempt to maximize photocatalytic activity and indeed often subdue photocatalysis as a way to protect paint resin from photodegradation.

There is a need for a commercially viable photoactive antifoulant composition that exhibits high photocatalytic activity and disperses easily in slurries and coating formulations.

SUMMARY OF THE INVENTION

The present invention contemplates the (i) production and (ii) application, including at industrial scale, of nanoparticulate titanium dioxide ($TiO_2$), and a sol, suitably used as a coating, made of such nanoparticulate $TiO_2$.

The present invention further contemplates composite photocatalytic materials. The preferred materials consist of (1) bodies, most preferably in the form of carrier particles, made of material that is non-photocatalytic and non-interfering with photocatalytically-induced reactions. These (1) bodies have (2) surfaces that are photocatalytic, ergo composite photocatalytic materials.

The present invention still further contemplates highly photocatalytic aggregate particles comprised of an extender particle with discrete photocatalytic titanium oxide particles exposed on the surface. The aggregates may be used as additives for making non-toxic, antifouling coatings and building materials. This invention also includes building materials containing these aggregates and processes for making the aggregates and slurries of the aggregates.

1. Production and Application of Nanoparticulate Titanium Dioxide $TiO_2$) Coating In its aspect concerning the production of nanoparticulate titanium dioxide ($TiO_2$), and the use of such $TiO_2$ in a sol and as a coating, the preferred particle size distribution of the nanoparticulate titanium dioxide ($TiO_2$) is between 1 nm to 100 nm (as determined from scanning electron microscopy) with less than 0.1 wt. % of carbon in the form of organic compounds or residues. Prior to application, the nanoparticulate $TiO_2$ coating has a particle size distribution of between 1 nm to 100 nm as determined from the absorption onset, a quantum size effect measurement as described in C. Kormann et al., *J. Phys. Chem.* 92, 5196 (1988), and a transparency of at least 99% measured in a 5 wt. % aqueous/hydrochloric acid solution between 400 and 700 nm in 180°/d geometry at a layer thickness of 10 $\mu$m. "Monodisperse" means that the collective particles typically have a range of maximum dimension, or diameter, that varies by less than a factor of ten (×10), and the collective particles will more typically less than a two times (×2) variation in size. Although not at all necessary for their photocatalytic action, and not absolutely necessary for the formation of a sol and the use of same as a coating, it becomes increasingly harder to get uniform quality results with wide variations in the $TiO_2$ starting material, and to that extent some homogeneity is preferred.

The (nanoparticulate) particles of titanium dioxide (within the coating according to the invention) may also be themselves coated with 0.1 to 1000 wt. %, preferably with 5 to 200 wt. %, relative to the $TiO_2$, of at least one oxide, hydroxide or hydrous oxide compound of aluminum, silicon, zirconium, tin, magnesium, zinc, cerium and phosphorus.

The present invention also contemplates a transparent titanium dioxide nanoparticulate liquid coating containing (i) a sol-forming medium and (ii) a sol-forming amount, not exceeding about 20 wt. %, of the nanoparticulate titanium dioxide in accordance with (other aspects of) the invention. The sol-forming medium preferably comprises (i) water, (ii) an alcohol containing 1 to 10 carbon atoms and at least one hydroxide group per molecule, or (iii) a mixture thereof.

1.1 Process for the Production of Nanoparticulate Titanium Dioxide, and a Sol Suitably Used as a Coating Therefore, in one of its aspects the present invention is embodied in a process for the production of the nanoparticulate titanium dioxide ($TiO_2$), from which $TiO_2$ may be produced a sol suitably used as a coating.

In the preferred process (i) an alkaline-reacting liquid is mixed with (ii) an aqueous solution of titanyl sulfate, optionally containing sulfuric acid, at elevated temperature until the resultant mixture reacts acidically and is neutralized to a pH of approximately between 5 and 9, and more preferably approximately 6.5–7.5, forming (or precipitating) flocculates of titanium dioxide nanoparticles.

The mixture obtained is cooled. The resulting titanium dioxide flocculate formed is isolated through separation by filtration or some other method conventionally recognized in the art, with the isolated nanoparticulate flocculate washed in water and then isolated again. This water-washing step is important. Maximum dispersion into a sol, as will next be discussed, cannot be obtained but that the titanium dioxide nanoparticulate flocculate is first washed in water (before being washed in an acid or alkali, immediately next discussed).

The isolated and water-washed nanoparticulate flocculate is then washed in an acid or an alkali, isolating as a product an acidic or alkaline titania concentrated slurry or cake.

This isolated titania concentrate is dispersed in a polar sol-forming medium to make a sol that is suitable as a coating. The sol is distinguished by, inter alia, being transparent. The sol also beneficially contains less than 0.1 wt. % of carbon, which is as good as or better than any titania sol of the prior art. Finally, this sol will prove to have some very interesting properties, immediately next discussed, when it is applied to a surface.

The transparent titania sol is suitable for application to a surface, including the surfaces of powders or of granules. After being coated with the sol, the surface may optionally be prepared by neutralizing with the required acidic or alkaline reacting compound, and subsequent washing with water. Notably, and importantly, neither the titania concentrate nor the $TiO_2$ of which it is comprised end up on the surface at anything like uniformity at the molecular level. Instead, the titania concentrate, or $TiO_2$, becomes applied to the surface as independent nanoparticles or small agglomerations of nanoparticles, or spots, or islands, that are in size and number dependent upon (i) the density of the titania concentrate in the sol and (ii) the area coated. These nanoparticles, or spots, or islands, are commonly widely separated relative to their own size. Although this uniformity might initially be perceived to be an undesired condition, it is in fact beneficial—see the next section 2.

After being coated with the sol, the surface may further optionally be coated with 0.1 to 1,000 wt. %, and more preferably with 5 to 200 wt. %, relative to $TiO_2$, of at least one oxide, hydroxide or hydrous oxide compound of aluminum, silicon, zirconium, tin, magnesium, zinc, cerium and phosphorus. The surface is still further optionally (i) dried and/or (ii) annealed.

The polar sol-forming medium preferably comprises water, an alcohol containing 1 to 10 carbon atoms and at least one hydroxide group per molecule, or a mixture thereof.

Perhaps surprisingly, the nanoparticulate $TiO_2$ coating according to the invention may be successfully produced within a large scale industrial process, namely $TiO_2$ pigment production using the sulfate process, and is thus very simple and economically viable.

The filter residue obtained (after the washings) and the coating obtained (after application of the sol film) using the process according to the invention may be inorganically and/or organically post-treated.

In principle, any aqueous titanyl sulfate solution is suitable as the educt. Said solution may optionally contain sulfuric acid. Contamination by metals which form soluble sulfates and chlorides, such as for example iron, magnesium, aluminum and alkali metals do not in principle disrupt the production process, unless the stated elements have a disadvantageous effect even in trace quantities in the intended application. It is thus possible to perform the process according the invention on a large industrial scale. Black liquor, as is obtained from the sulfate process by digesting ilmenite and/or titanium slag with sulfuric acid, dissolving the resultant digestion cake in water and performing clarification, may for example be used as the educt.

The production process according to the invention is, however, not restricted to black liquor as the educt. Examples of other processes for the production of titanyl sulfate solution suitable as an educt include:

1) dissolution of commercial grade titanyl sulfate in water;
2) dissolution/digestion of titanium dioxide and $TiO_2$ hydrates, for example orthotitanic acid, metatitanic acid, in $H_2SO_4$;
3) dissolution/digestion of alkali metal and magnesium titanates, also in hydrous form, in $H_2SO_4$;
4) reaction of $TiCl_4$ with $H_2SO_4$ to form $TiOSO_4$ and HCl, as described in DE-A 4 216 122.

The products, in particular those from 1), 2) and 3), are preferably used as titanyl sulfate solutions when traces of foreign metals (for example iron) are not desired in the product according to the invention.

In order to achieve economically viable operation, the titanyl sulfate solutions to be used according to the invention preferably contain 100 to 300, and more particularly preferably 170 to 230 g of titanium/l, calculated as $TiO_2$.

Aqueous solutions of ammonium hydroxide, sodium hydroxide, or potassium hydroxide are preferably used as the alkaline-reacting liquid; it is, in principle, also possible to use carbonates of sodium, potassium and ammonium, but these are less suitable due to vigorous evolution of $CO_2$. Ammonium hydroxide solution is particularly preferred as sodium and potassium ions are not introduced as a contaminant and is used to illustrate performance of the process in greater detail.

The quantity of ammonia should be calculated such that the reaction medium at the end of step a) has a final pH of approximately between 5 and 9, and more preferably between 6.5 and 7.5.

The ammonia is preferably used as an ammonium hydroxide solution having a concentration of approximately between 1 to 8 molar $NH_4OH$ and more preferably between 1 to 4 molar $NH_4OH$.

The reaction of ammonium hydroxide solution with the titanyl sulfate solution preferably proceeds in such a manner that the ammonium hydroxide is added to a solution of titanyl sulfate, heated to approximately 60 to 100° C.

Preferably the reaction of the ammonium hydroxide and titanyl sulfate solution can also be carried out by adding the two reactants simultaneously and mixing them with stirring at temperatures of between 60 and 100° C.

This reaction of the titanyl sulfate solution should preferably be performed with vigorous stirring and at temperatures of 60 to 100° C.

The addition of the ammonium hydroxide to the titanyl sulfate solution should preferably take no longer than 30 minutes.

Once reacted, the resultant mixture should preferably be quenched to temperatures of below 60° C. and then optionally stirred for ¼ to 1 hour at this temperature.

In summary, the production of the sol suitable as a coating, and the sol so produced, has myriad, and distinguishing, advantages. The sol is uniquely transparent while achieving the desirably low carbon of the best prior art titania sols. The yield in making the sol is unexcelled; virtually 100% of the precipitated titanium flocculates are taken up into the sol. The process of making the sol is readily scalable to industrial scale. Finally, and as a seemingly subtle differentiation in the sol the use and benefit of which is unanticipated in the prior art, the sol, when used as a coating, will not deposit its titanium dioxide uniformly (upon a coated surface, which may be a particle) but will instead lay down the titanium dioxide in microparticles, or spots, or islands. The very significant advantage of this is immediately next discussed in section 2.

2. Composite Photocatalytic Materials

In its aspect concerning the realization of composite photocatalytic materials, the preferred material of the present invention includes, as previously stated, (1) bodies that are most preferably in the form of carrier particles and that are made of material that do not interfere with photocatalytic activity and do not adversely interact with other components in an end-use application. These (1) bodies that are non-deleterious to photocatalytic reaction have (2) surfaces that are photocatalytic, forming thus a composite photocatalytic material.

Moreover, these (2) surfaces are not substantially evenly possessed of photocatalytic material and photocatalytic action, but preferably have such photocatalytic material highly specifically located in "spots", or "islands" that may themselves be either 2-or 3-dimensional.

To realize these "islands" of photocatalyst, the (2) surfaces of the (1) bodies, or carrier particles, are not made from continuous films of photocatalytic material, but are instead made by attaching discrete nanoparticles of photocatalyst. These nanoparticles of photocatalyst are preferably smaller—normally $1 \times 10^{-9}$ to $1 \times 10^{-7}$ in diameter—than are the carrier particles themselves, which are commonly about $1 \times 10^{-7}$ to $1 \times 10^{-2}$ meters in diameter, depending on application.

Both the size of the (2) carrier particles, or bodies, and the density of the spots, or islands, of (1) surface photocatalytic material are a function of intended application. An exemplary application of a carrier large particle might be for use in a gravel-like roof coating where it is substantially desired only that large, ground-observable, patches of algae should not grow on the roof. In this application the photocatalytic spots, or islands, might also be relatively widely separated, the main goal not being to kill every bacteria or algal cell on the roof, but to prevent formation of a bio-film. Exemplary applications of small carrier particles include the lips of a swimming pools, bathroom tiles, and hospital coatings where it is desired to avoid all bacterial growth whatsoever. Not only are the carrier particles small, but the photocatalytic spots, or islands, may be relatively close spaced (although normally not continuous).

As an aside, the photocatalyst of the present invention is generally not intended for use in liquids other than coatings, and certainly not for antiseptic solutions where photocatalyst suspensions kill microbes or algae on surfaces. The only time the inventor has used photocatalyst suspensions was in lab tests wherein algae was suspended in water and photocatalyst particles were then introduced into the water to see "for a first glimpse" whether the photocatalyst killed the algae. However, it is contemplated that the photocatalyst of the present invention could be dispersed in water to destroy microbial suspensions. One such application could be to destroy harmful algae blooms in lakes and bays. The three main benefits of using photocatalyst of the present invention in natural waterways would be (i) low toxicity to higher life forms, (ii) limited persistence in the environment (the concentrated contaminants of natural water systems tend to foul the photocatalyst, inactivating it over time), and (iii) excellent dispersion properties in water (in contrast to poor dispersion for virgin photocatalyst).

Accordingly, by incorporating but minute amounts of dispersed photocatalytic nanoparticles solely upon the surfaces of carrier particles—most typically in an amount of less than 20% and more typically 5% by weight in the composite material—these dispersed photocatalytic nanoparticles, and diverse surfaces coated with the composite material, are highly effective in killing microorganisms, including both algae and bacteria, in the presence of light in the visible or ultraviolet wavelengths. Indeed, by attaching microparticles of preferred photocatalytic materials of titanium dioxide, zinc oxide and tungsten oxide and mixtures thereof onto the surface of particles of silicate and carbonate powders and sands, mineral and mineral composites, inorganic pigments, construction aggregates, polymers and like common materials in an amount of less than 10% by weight, the composite particle's so formed are at least 50% as effective in killing algae and bacteria as are the pure photocatalysts themselves. Accordingly, there is at least a five-to-one (5:1), and more typically a twenty-to-one (20:1), gain in efficiency in the usage of the photocatalytic materials—which are greatly more expensive than are the materials from which the carrier particles are made.

The composite photocatalytic materials, preferably particulate materials, may themselves be combined with any of dispersants, carriers, binders and the like to make any of aqueous solutions, coatings, paints and the like as exhibit any of algicidal, fungicidal, and/or anti-bacterial effects. Liquids, aggregates and solids incorporating the composite photocatalytic materials of the present invention may be, for example, coated or painted onto, by way of example, the interior and exterior surfaces of buildings and swimming pools.

Although no theory of the operation of the composite photocatalytic materials of the present invention is necessary to make these materials, nor to take advantage of their operational characteristics, it is possible to speculate on the operation of the materials of the present invention. It is hypothesized that only a minute microparticle of pure photocatalytic material such as titanium dioxide, zinc oxide and tungsten oxide and mixtures thereof is necessary to adversely affect a much larger bacterium, or a cell of an algae; that it is not the total amount of photocatalyst that does the damage to lower life forms, but the manner in which a photocatalyst is deployed against these life forms.

Apparently it is not necessary for control of simple life forms to expose in the presence of light the entirety of the life form to a photocatalyst in order to enjoy a prophylactic effect. It is apparently sufficient for a prophylactic effect to expose only a minute region of the life form. It may even be the case that a bacterium or an algae will retreat from an extensive area of photocatalyst with less damage than it will sustain when exposed, hypothetically for a longer time, to but a microscopic spot, or particle, or photocatalyst to which its primitive sensory system is insufficiently sensitive. The present invention suggests that large surfaces, such as walls of swimming pools and buildings, should not have photocatalyst evenly applied so that, at some density of adjacent bacterial or algal life forms, a bio-film will be formed, the photocatalyst overwhelmed (including by occlusion of light energy), and the surface populated. Instead, it may be preferable that the surface act as a "trojan horse", according areas devoid of photocatalyst—which areas are sufficient in size to be populated by one or a few bacteria or algal cells until these bacteria or algae grow and/or reproduce, forcing members of the incipient community into damaging contact with minute regions of photocatalyst. These minute regions, or microdots, or microparticles, of photocatalyst may, at their high concentrations, be very effective in promoting electron exchange in the presence of impinging light. They may become "hot spots" of "stinging" death to those microorganisms with which they come into contact.

The mechanism(s) of photocatalytically-induced fungicidal, bacteriocidal and like effects are poorly understood, but the present invention suggests that there is more to the conservative and focused deployment of photocatalysts than simply saving money by minimizing usage. The present invention suggests that photocatalyst should be parsimoniously used as a microbial rapier—the point of which can be deadly to microbial life—instead of as a bludgeon by which the substantial surface of a microbe is substantially evenly irritated in a manner that may not prove fatal to the microbe.

2.1 A Composite Photocatalytic Material

Accordingly, in another of its aspects the present invention is embodied in a composite body exhibiting a photocatalytic effect. The body has (i) a core consisting essentially of a material without deleterious photocatalytic effect on the composite body nor adverse interaction with other components in an end-use application, and (ii) a photocatalytic material upon the surface of the core. This photocatalytic material is less than 20% by weight of the combined photocatalytic material and the core.

The core is a preferably a particle, and more preferably a particle of less than 1 (one) centimeter in diameter. Meanwhile, the photocatalytic material is preferably a multiplicity of particles each of which is preferably of diameter less than one hundred (100) nanometers. By this construction the composite body is also a particle.

The core preferably consists essentially of a material, nondeleterious to photocatalytic reactions, drawn from the group consisting of silicates and carbonates, mineral and mineral composites, metal oxides, inorganic pigments, and construction aggregates. Alternatively, the core may consist essentially of a polymer. The polymer core is preferably drawn from the group consisting essentially of acrylics, acrylonitriles, acrylamides, butenes, epoxies, fluoropolymers, melamines, methacrylates, nylons, phenolics, polyamids, polyamines, polyesters, polyethylenes, polypropylenes, polysulfides, polyurethanes, silicones, styrenes, terephthalates, vinyls.

The photocatalytic material is preferably drawn from the group of metal compound semiconductors consisting essentially of titanium, zinc, tungsten and iron, and oxides of titanium, zinc, tungsten and iron, and strontium titanates. This compound semiconductor photocatalytic material may be combined with a metal or metal compound drawn from the group consisting of nickel, cobalt, zinc, palladium, platinum, silver, and gold. Most preferably, the photocatalytic material is drawn from the group of metal compound semiconductors consisting essentially of anatase titanium dioxide and zinc oxide.

The composite photocatalytic material is preferably in the form of particles having a diameter from 100 nanometers to 1 centimeter, which diameter depends upon the core size selected and the intended end-use application.

The weight of the photocatalytic material is preferably less than 20% of the weight of the core, and more preferably less than 10% of the weight of the core.

The composite photocatalytic material in accordance with the present invention is usefully incorporated in other compositions. When so incorporated, it is preferably so incorporated in amounts from 0.001% to 85% by volume. The composite photocatalytic material may be incorporated with, or on, one or more materials from the group of building materials consisting of concrete, cement, stucco, masonry, roofing shingles, wall shingles, building siding, flooring materials and swimming pool surfaces. The composite photocatalytic material may be incorporated in a composition that is effective as an anti-fouling coating. For example, it may be incorporated in a concrete coating effective in killing by contact algae, fungus and/or bacteria on surfaces.

Most typically, at a proportion by weight in the composite particle of less than 10%, the efficacy of the photocatalytic material within the composite particles to kill by contact both algae and bacteria upon surfaces is at least one-half (0.5) as good as is the efficacy of this same photocatalytic material in purest form to kill. In other words, at least equal killing effect is realized with at least a five to one (5:1) reduction in the amount of photocatalytic material used (when this photocatalytic material is upon the surface of the composite particles).

2.2 Methods of Making Composite Photocatalytic Particles

In yet another of its aspects (concerning the making and use of photocatalytic materials), the present invention is embodied in methods of making composite photocatalytic particles.

In one method an aqueous slurry of first particles—these particles consisting essentially of a material without deleterious photocatalytic effect on the composite particle nor adverse interaction with other components in an end-use application, and having a size in the range from 100 nanometers to 1 centimeter diameter—is prepared.

To this slurry is added a colloidal suspension of 0.1% to 60% by weight second particles, which second particles consist essentially of photocatalytic material having diameters in the range from 1 to 100 nanometers. The combined weight of second particles in the colloidal suspension is less than 20%, and more preferably less than 10%, of the combined weight of the first particles that are within the aqueous slurry.

The aqueous slurry and the colloidal suspension is mixed so that the photocatalytic material second particles attach through van der Waals forces or chemical fusion to the nondeleterious material first particles, forming a slurry of composite particles. In these composite particles the relatively smaller photocatalytic material second particles are located upon the surfaces of the relatively larger, nondeleterious material, first particles.

The photocatalytic material is in weight preferably less than 20%, and more preferably less than 10%, of the first particles. The added colloidal suspension added is preferably from 0.1% to 60% by weight second particles. The colloidal suspension added is preferably of the highest solids concentration at which the suspension is stable, normally being in the range from 14% to 50% by weight.

The pH of the mixing is often beneficially adjusted so that both the photocatalytic material second particles and the nondeleterious material first particles are displaced to the same direction—whether above or below—from their respective isoelectric points (those points at which the particles have a neutral net charge). Furthermore, the nondeleterious material first particles and the photocatalytic material second particles may also have opposite charge.

The adding of the colloidal suspension of second particles, or the mixing of the aqueous slurry and the colloidal suspension, or both the adding and the mixing, may optionally transpire in the presence of at least one dispersant.

The method may continue with one or more well-known finishing steps such as filter, wash and/or dry the composite photocatalytic particles.

When the aggregation of composite photocatalytic particles is dried, composite particles with heat resistant cores are then preferably annealed in a kiln to create stronger fusion bonds between the photocatalytic material second particles and the nondeleterious material first particles and/ or to improve the photocatalytic nature of the photocatalyst by changing its crystalline form. Moreover, the annealed composite photocatalytic particles are preferably rapidly cooled to ambient room temperature; this may be simply accomplished by removing the hot material from the kiln to facilitate heat transfer away from the material. The time period of this cooling is necessarily dependent, at least in part, upon the temperature of the annealing and the amount of the composite photocatalytic particles. However, it is preferably less than six hours. Since this forced rapid cooling might normally be considered to induce fracturing in metals, it is uncommonly applied to the materials (including metal oxides) of the present invention. However, it has benefit in that it increases photocatalytic activity.

3. Photocatalytic Aggregate Particles

In still yet another of its aspects, the present invention contemplates highly photocatalytic aggregate particles comprised of an extender particle with discrete photocatalytic titanium oxide particles exposed on the surface. The extender particle reduces the amount of premium photocatalyst required to achieve desired photocatalytic activity in a finished product. The discrete nature of the photocatalytic titanium oxide particles, applied in sufficient number, increases the photoactivity of the aggregate particles by increasing their photoactive surface area verses the surface area provided by a relatively flat continuous coating. The aggregates of this invention exhibit an inhibitory effect on surface-borne microorganisms when the mixtures are incorporated into building materials such as masonry, roofing shingles, siding, and antifouling coatings. Further, the aggregate particles show improved handling and dispersion in coating preparations versus virgin photocatalyst.

The invention also contemplates processes for making such aggregates, slurries of the aggregates, coatings, building materials, and masonry containing the aggregates.

3.1 The Preferred Photocatalytic Aggregates

The preferred aggregate particles of the present invention—generally comprised of an extender particle with discrete photocatalytic titanium oxide particles exposed on the surface, which exhibit antifouling properties and improved dispersion in slurries and coatings—consist essentially of photocatalytic titanium oxide, preferably titanium dioxide in the anatase crystalline form, at less than about 20% by weight, preferably less than 10% by weight, and more preferably less than 6% by weight, and an extender particle at greater than 20% by weight. Preferred extender particles include silicate and carbonate powders, mineral and mineral composites including calcined clay and wollastonite, metal oxides including zinc oxide, inorganic pigments, and construction aggregates including roofing granules.

In one preferred embodiment, colloidal anatase titanium dioxide in an amount less than 6 weight % is dispersed on the surface of crystalline silica powder having an average particle diameter of 0.7 to 5 microns. In another preferred embodiment, colloidal anatase titanium dioxide in an amount less than 6 weight % is dispersed on the surface of zinc oxide powder having an average particle diameter of 0.7 to 5 microns.

This invention also includes anti-fouling building products, including coatings and masonry compositions, comprising aggregate photocatalytic particles of this invention at a volume concentration of 0.001% to 85% where the anti-fouling coatings and masonry resist the growth of microorganisms when U.V. or visible light energy is present to activate the aggregate photocatalytic particles. Building products include roofing granules, roofing shingles, building siding, wall shingles, hard flooring, and swimming pool surfaces.

3.2 Preferred Processes for Producing Photocatalytic Aggregates

Several different processes for making the above-described aggregate photocatalytic materials are preferred. In one embodiment, an aqueous slurry of extender particles are mixed with a solution of titanyl sulfate and by the addition of an alkaline reacting agent, discrete titanium dioxide particles are deposited onto the extender particles.

In another embodiment, an alkaline or acidic titania sol is mixed with extender particles where the particles in the titania sol have an average diameter size within the range of about 1 to about 100 nanometers. The solution is maintained such that the extender particles and the sol particles are both above or below their respective isoelectric points such that substantially discrete particles of titanium dioxide are dispersed onto the surfaces of the extender particles in an amount less than 20 weight % based on aggregate particle weight.

These and other aspects and attributes of the present invention will become increasingly clear upon reference to the following drawings and accompanying specification.

BRIEF DESCRIPTION OF THE DRAWINGS

FIG. 3 is a graphical depiction of three example arrangements of discrete photocatalytic particles, particularly titanium dioxide particles, on the surface of an extender, or carrier, or core particle so as to form a photoactive antifouling aggregate, where

Figure 1A:
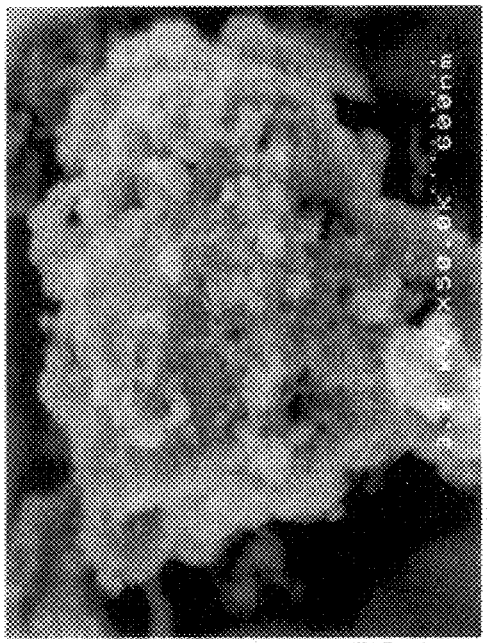
FIG. 1, consisting of FIGS. 1a through FIG. 1c, are scanning electron micrographs of silica particles with a coating of nano-particulate $TiO_2$ at 4% by wt. silica according to the invention.

The following examples are intended to illustrate the invention in greater detail.

DESCRIPTION OF THE PREFERRED EMBODIMENT

The following description is of the best mode presently contemplated for the carrying out of the invention. This description is made for the purpose of illustrating the general principles of the invention, and is not to be taken in a limiting sense. The scope of the invention is best determined by reference to the appended claims.

Although specific embodiments of the invention will now be described, it should be understood that such embodiments are by way of example only and are merely illustrative of but a small number of the many possible specific embodiments to which the principles of the invention may be applied. Various changes and modifications obvious to one skilled in the art to which the invention pertains are deemed to be within the spirit, scope and contemplation of the invention as further defined in the appended claims.

1. Process for the Production of Nanoparticulate Titanium Dioxide

It will be recalled that one embodiment of the present invention is as a process for the production of the nanoparticulate titanium dioxide coating. The preferred process includes a) mixing an alkaline-reacting liquid with an aqueous solution of titanyl sulfate, optionally containing sulfuric acid, at elevated temperature until the resultant mixture reacts acidically and is neutralized to a pH of approximately between 5 and 9, and more preferably approximately 6.5–7.5, forming flocculates of titanium dioxide nanoparticles;

b) cooling the mixture obtained in step a);

c) isolating, through filtration or some other method conventionally recognized in the art, the resulting titanium dioxide nanoparticle flocculate formed in step b);

d) washing said nanoparticle flocculate in water and isolating again;

e) washing said nanoparticle flocculate in an acid or alkali and isolating the product as an acidic or alkaline titania concentrate;

f) dispersing said titania concentrate in a polar sol-forming medium to make a transparent sol;

g) applying a film of the titania sol to a surface, including powders or granules;

h) optionally neutralizing said surface with the required acidic or alkaline reacting compound and subsequently washing said surface with water;

i) optionally coating said titania-coated surface with 0.1 to 1,000 wt. %, preferably with 5 to 200 wt. %, relative to $TiO_2$, of at least one oxide, hydroxide or hydrous oxide compound of aluminum, silicon, zirconium, tin, magnesium, zinc, cerium and phosphorus;

j) optionally drying and annealing said surface.

The sol-forming medium referred to in step f) preferably comprises water, an alcohol containing 1 to 10 carbon atoms and at least one hydroxide group per molecule, or a mixture thereof.

The nanoparticulate $TiO_2$ coating according to the invention may surprisingly also successfully be produced within a large scale industrial process, namely $TiO_2$ pigment production using the sulfate process, and is thus very simple and economically viable.

The filter residue obtained (after step d or e) and the coating obtained (after step g) using the process according to the invention may be inorganically and/or organically post-treated.

In principle, any aqueous titanyl sulfate solution is suitable as the educt. Said solution may optionally contain sulfuric acid. Contamination by metals which form soluble sulfates and chlorides, such as for example iron, magnesium, aluminum and alkali metals do not in principle disrupt the production process, unless the stated elements have a disadvantageous effect even in trace quantities in the intended application. It is thus possible to perform the process according to the invention on a large industrial scale. Black liquor, as is obtained from the sulfate process by digesting ilmenite and/or titanium slag with sulfuric acid, dissolving the resultant digestion cake in water and performing clarification, may for example be used as the educt.

The production process according to the invention is, however, not restricted to black liquor as the educt. Examples of other processes for the production of titanyl sulfate solution suitable as an educt are:

1) dissolution of commercial grade titanyl sulfate in water;
2) dissolution/digestion of titanium dioxide and $TiO_2$ hydrates, for example orthotitanic acid, metatitanic acid, in $H_2SO_4$;
3) dissolution/digestion of alkali metal and magnesium titanates, also in hydrous form, in $H_2SO_4$;
4) reaction of $TiCl_4$ with $H_2SO_4$ to form $TiOSO_4$ and HCl, as described in DE-A 4 216 122.

The products, in particular those from 1), 2) and 3), are preferably used as titanyl sulfate solutions when traces of foreign metals (for example iron) are not desired in the product according to the invention.

In order to achieve economically viable operation, the titanyl sulfate solutions to be used according to the invention preferably contain 100 to 300, particularly preferably 170 to 230 g of titanium/l, calculated as $TiO_2$.

Aqueous solutions of ammonium hydroxide, sodium hydroxide, or potassium hydroxide are preferably used as the alkaline-reacting liquid; it is, in principle, also possible to use carbonates of sodium, potassium and ammonium, but these are less suitable due to vigorous evolution of $CO_2$. Ammonium hydroxide solution is particularly preferred as sodium and potassium ions are not introduced as a contaminant and is used to illustrate performance of the process in greater detail.

The quantity of ammonia should be calculated such that the reaction medium at the end of step a) has a final pH of approximately between 5 and 9, and more preferably between 6.5 and 7.5.

The ammonia is preferably used as an ammonium hydroxide solution having a concentration of approximately between 1 to 8 molar $NH_4OH$ and more preferably between 1 to 4 molar $NH_4OH$.

The reaction of ammonium hydroxide solution with the titanyl sulfate solution preferably proceeds in such a manner that the ammonium hydroxide is added to a solution of titanyl sulfate, heated to approximately 60 to 100° C.

Preferably the reaction in step a) can also be carried out by adding the two reactants simultaneously and mixing them with stirring at temperatures of between 60 and 100° C.

Step a) should preferably be performed with vigorous stirring and at temperatures of 60 to 100° C.

The addition of the ammonium hydroxide in step a) should preferably take no longer than 30 minutes.

After step a), the mixture should preferably be quenched to temperatures of below 60° C. and then optionally stirred for ¼ to 1 hours at this temperature.

The resultant mixture is turbid to a greater or lesser extent and comprised of flocculates of nanoparticlulate $TiO_2$.

After cooling, the flocculate is isolated by filtration or other conventional separation technique and then washed with water to remove contaminating sulfur compounds and other water-soluble contaminants. After isolating the $TiO_2$ again, the flocculate is washed with a monobasic acid or alkali to remove further contaminants and introduce the ions necessary for sol formation.

The flocculate is nanoparticulate titanium dioxide having a particle size of between 1 and 100 nm, containing less than 0.1 wt. % of carbon and having a transparency of at least 99% (see above).

Addition of the ammonium hydroxide in step a) results in an initial increase in viscosity of the reaction medium as the resultant bulky flocculates form. Continued stirring distributes the flocculates more evenly resulting in a decrease in viscosity. The resulting flocculates may be separated simply by settling, i.e. standing undisturbed for at least 12 hours and decantation. Due to their size (preferably greater than 1 micron), the resultant bulky flocs may readily be centrifuged and filtered.

The precipitate is then washed with water, preferably by dispersing the precipitate in 3 to 10 times its weight in water, and then isolating the precipitate through filtration or other conventional separation method.

The said precipitate is then washed in a monobasic acid or alkali solution by preferably dispersing the precipitate in 1 to 6 times its weight in acid or alkali and then isolating the precipitate through filtration or other conventional separation method as is know in the art. The preferred washing agent is hydrochloric acid, which is used to illustrate the further processing in greater detail. The same procedure should be used with other acids and alkali.

The HCl concentration in the hydrochloric acid should preferably be no less than 3 molar, preferably 3 to 6 molar, and particularly preferably 4 to 6 molar.

Depending upon the filter unit and starting material, the acid or alkali-washed titania concentrates typically contain 4 to 40 wt. % of $TiO_2$, the remainder being wash acid or wash alkali, moisture and possibly small quantities of contaminants. The nanoparticles may be stored as acidic or alkaline concentrates in air-tight containers at room temperature without change for some weeks, and as necessary, suspended in a sol-forming medium for producing sol coatings.

Once redispersed in water, the titania concentrates yield "solutions" (sol coatings) which, apart from slight opalescence (Tyndall effect), are clear, transparent and colorless or nearly colorless. The $TiO_2$ is present in these sol coatings exclusively as nano-particles having a diameter of between 1 and 100 nm.

It is possible in this manner to produce strongly acidic or strongly alkali, virtually completely transparent (water-clear) sol coatings containing up to approximately 20 wt. % of $TiO_2$. At a concentration of 5 wt. % of $TiO_2$, the transparency of the sol coatings is at least 99% over the visible range of the spectrum from 400 nm to 700 nm wavelengths (measured in 180°/d geometry at a layer thickness of 10 $\mu$m).

Generally, a sol coating may be created my combining 2 to 3 parts by weight water with one-part by weight acidic or alkaline concentrate. Such sol coatings are also generally stable for some weeks. As much as 10 to 20 parts additional water may be added to further dilute the sol coating.

Similar sol coatings my also be produced in polar organic solvents, primarily in mono- and polyhydric short-chain alcohols, such as for example ethanol and 1,4-butanediol. The alcohols preferably contain 1 to 10 carbon atoms per molecule.

An alternative method of carrying out the invention is forming an aqueous colloidal coating by combining water with the acidic or alkali titania concentrate of this invention and adding at least one dispersant. The dispersant may also be added simultaneously with the water. The dispersant can be selected from those described in U.S. Pat. No. 5,393,510, the teachings of which are incorporated herein by reference. Examples of dispersants include alcohol amines such as 2-amino-2-methyl-1-propanol, 2, 2', 2"-nitrilotrisethanol, 2,2'-iminobisethanol, 2-aminoethanol and the like, and 1-amino-2-propanol, polyacrylates, citric acid and tetrapotassium pyrophosphate (TKPP) and the like. Typically a combination of the above dispersants is preferred in an amount of about 0.05 to about 5% based on $TiO_2$ weight, or based on total solids weight when the coating is mixed with powders or granules.

Spread thinly onto a surface, the nano-particulates of the sol coatings will be attracted to the surface by van der Waals' forces and may be further anchored to the surface material by stronger chemical bonds such as fusion bonds. Coatings may be applied to continuous solid surfaces by dip-coating, rolling, brushing, or other such application procedure. Coatings may be applied to particles, such as powders and granules, by direct mixing, fluid bed application, or other suitable application procedure. It has been found that uniform surface coatings of nano-particulate $TiO_2$ on powders and granules is best achieved by maintaining the to-be-coated particles and the colloidal particles at both above or below their respective isoelectric points such that substantially discrete particles of titania are evenly dispersed onto the surfaces of the target particles. In one preferred embodiment of this invention, titania suspended in a sol medium containing HCl is added to particulates pre-wetted with a solution of HCl resulting in evenly dispersed nanoparticles of $TiO_2$ on the particulates.

Where acidic or alkali residue may impact the performance of the nano-coating, the coated surface may be further washed with a neutralizing agent (such as a dilute ammonium hydroxide solution when the residue is acidic or a dilute solution of HCl when the residue is alkali) and then the resulting surface washed with water to remove any remaining contaminants.

In the event that a reduction in photoactivity is desired, the nanoparticles may be inorganically coated (post-treated), wherein, as with pigment $TiO_2$, coating is performed with oxides, hydroxides or hydrous oxides of one or more of the following elements: Al, Si, Sn, Mg, Zn, Ce, P. The quantities to be used amount to 0.1 to 1000, preferably to 5 to 200 wt. %, relative to $TiO_2$.

Inorganic post-treatment is not necessary, and generally undesirable, if the product is used as a catalyst for the photochemical degradation of organic compounds (polymers, pollutants) or as a support for dye solar cells. However, surprisingly it has been found that a coating of silicate precipitated onto the nano-coating from a solution of sodium silicate has a limited impact on photocatalytic activity when the amount of silicate precipitated is approximately less than 5 times the amount of $TiO_2$ in the nano-coating. The silicate is preferably precipitated from a solution of sodium silicate containing 0.05% to 2% silica by wt. Precipitation is accomplished by titrating the sodium silicate solution with an acid, such as HCl, to a neutral pH of about 7. The surface is then preferably washed to remove contaminants. Such silicate coatings may be desired to further enhance the adhesion of the nano-coating to a surface.

As a final step in the process for making the nano-coating, the coated surface may be dried and annealed to drive off moisture, crystallize the $TiO_2$ and better fuse the nanoparticulate $TiO_2$ to the surface. The photocatalytic activity of the coating may be optimized by annealing the coating at a temperature of approximately between 400° C. and 650° C. for 30 minutes to 5 hours. Photocatalytic activity may be reduced by annealing at a temperature above 700° C. which temperature induces a crystalline phase change in the $TiO_2$ from the anatase form to the less photocatalytic rutile form. Annealing and its effect on photocatalytic activity is discussed in further detail in L. Gomathi Devi's "Photocatalytic degradation of p-amino-azo-benzene and p-hydroxy-azo-benzene using various heat treated $TiO_2$ as the photocatalyst", *J. of Photochem. and Photobio. A: Chem.* 121 (1999), 141–145.

In applications in which acid excesses have a disruptive effect, the sol coatings according to the invention may subsequently be stabilized in the neutral pH range in a manner known in principle, for example with acetylacetone (WO 93/05875) or with hydroxycarboxylic acids (EP-A 518 175).

The coating of nanoparticulate titanium dioxide is used as a photocatalyst to prevent fouling from microorganisms on surfaces, as a U.V. screening agent, and as a flame retardant.

1.1 Example of the Process for the Production of Nanoparticulate Titanium Dioxide Coatings An example of the process of the invention for the production of nanoparticulate titanium dioxide coatings is as follows:

Recommended Laboratory supplies and equipment for laboratory preparation of nanoparticulate titanium dioxide coatings include (i) a fume hood, (ii) 2 heated stir plates, (iii) a glass stir rod, (iv) 100, 250 and 1000 ml liter beakers, (v) a 1000 ml filtration flask, (vi) 10 ml and 100 ml graduated cylinders, (vii) cellulose nitrate filtration paper, 90 mm circles, 0.45 micron, (viii) teflon coated magnetic stir bars, (ix) an aspirator or other vacuum source for filtration (x) lab balances (+–1 mg and +–0.1 mg), (xi) a container for the ice bath, (xii) a 1 liter filtration flask (Erlenmeyer with a sidearm), (xiii) a Coors-type ceramic Buchner funnel with fixed plate for 90 mm filtration paper, (xiv) a rubber gasket for the filtration flask, (xv) a mortar and pestle (100 ml minimum size for combining sol with silica), (xvi) a drying oven (to 130° C.), (xvii) a ceramic or pyrex vessel for annealing, (xviii) an annealing oven (to 650° C.), (xix) 10 ml pipettes, (xx) a pH meter or pH paper (pH 7), (xxi) a thermometer (to 100° C.), (xii) a squirt bottle for water, and (xiii) a non-metallic spatula for removing filter cake from the filter. A 1 liter vessel with temperature control and stir capability is optional.

Required chemicals include (i) deionized water, (ii) ammonium hydroxide, aq (29.6%), (iii) hydrochloric acid, aq (37%), (iv) TiOSO4 (Noah Technologies), and (v) water ice.

210 ml water is mixed with 100 g $TiOSO_4$ (Noah Technologies, comprising 80.3% $TiOSO_4.2H_2O$, 8.3% free acid sulfuric, 11.4% moisture) and heated to 85° C. while stirring in a jacketed glass vessel using a mechanical stirrer. 270 ml $NH_4OH$ 1.91 M is slowly added over 10 minutes with continued stirring causing titania to precipitate from the solution. The stirring continues until the viscosity of the solution thins and stabilizes. The solution is then neutralized to about pH 7 with the addition of 14 ml $NH_4OH$ 3.81 M and stirred for an additional 15 minutes at 85° C. The suspension is then quenched to 28° C. over 20 minutes and the precipitate filtered using a 0.45 micron nitrocellulose filter. The white precipitate is then re-suspended in 1 liter water to rinse the flocculates and then filtered again. The resulting filter cake is re-suspended in 250 ml HCl 6 M and filtered again. The resulting acidic titania cake is comprised of nanoparticulate titania. The cake may be used immediately for making a colloidal titania coating or stored in an air-tight container for later use. To make a transparent colloidal coating, a quantity of the acidic titania cake (about 9% by wt. $TiO_2$) is dispersed in three times its weight in water. The stable pH range for titania sol (for sol containing 4.6% TiO2 by wt. % in the method described in this example, the sol contains 2.3% TiO2 by wt.) is 1.1 (+−0.2) −1.8 (+−0.2) pH. The titania completely precipitates from the sol at 5.2 (+−0.2) pH.

Figure 1B:
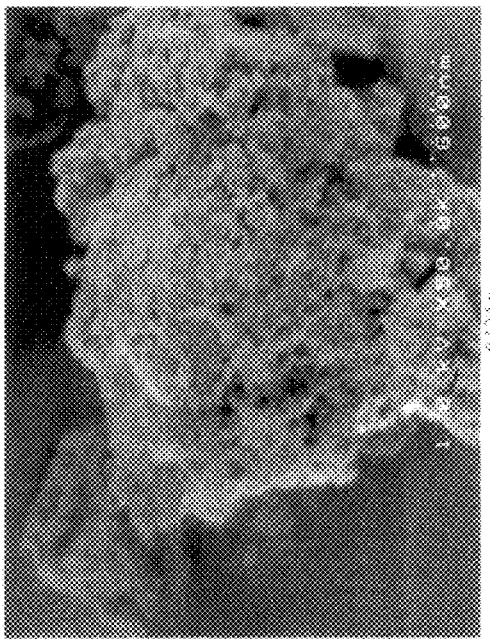
Figure 1C:
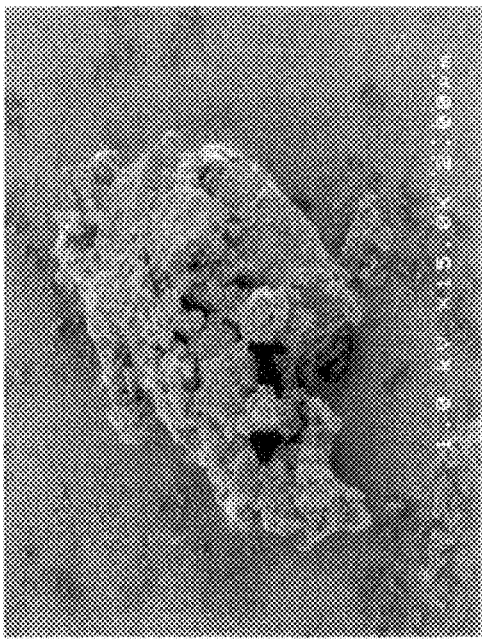
Figure 2A:
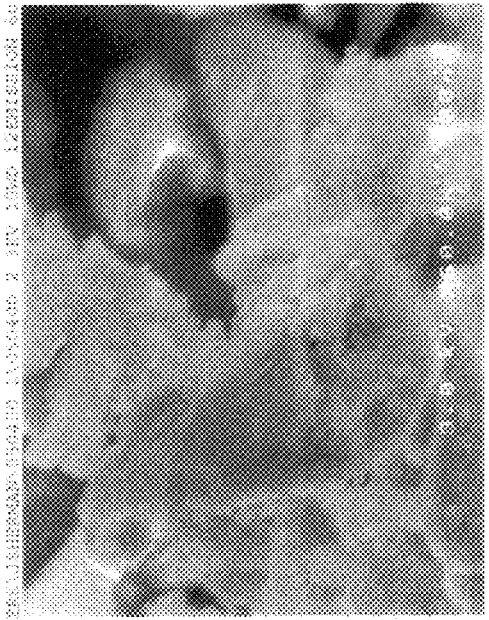
FIG. 2, consisting of FIGS. 2a through FIG. 2d, are scanning electron micrographs of silica particles with a coating of nano-particulate $TiO_2$ at 0.5% by wt. silica according to the invention.
Figure 2B:
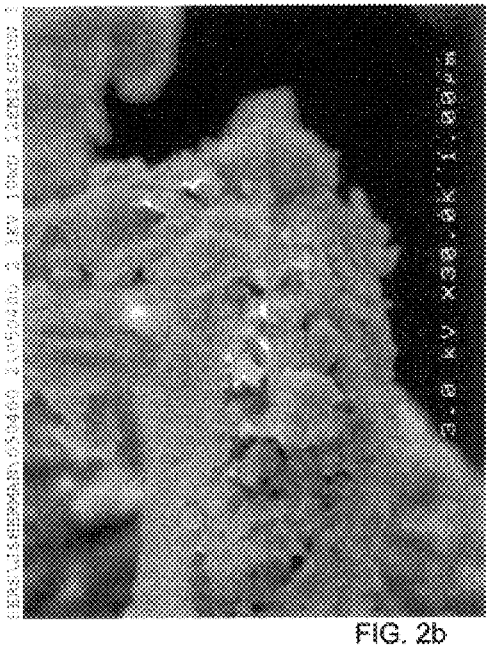
Figure 2C:
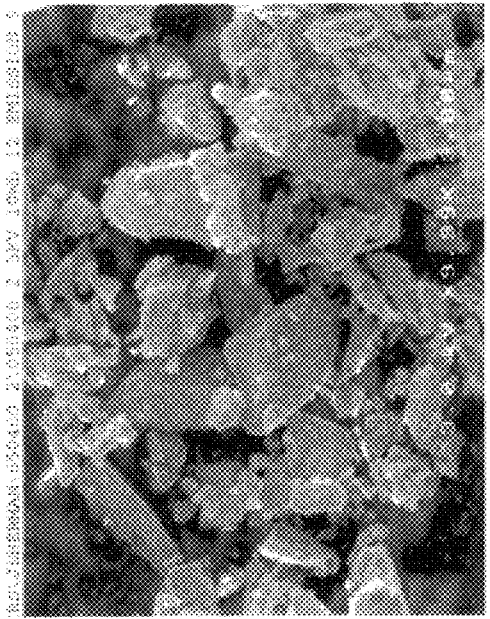
Figure 2D:
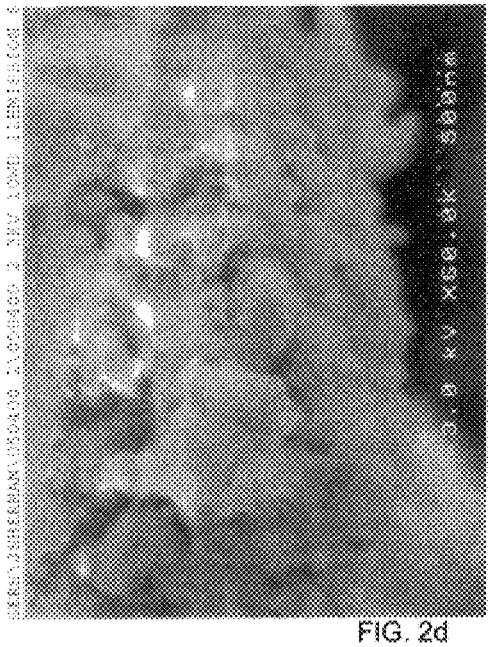

FIGS. 1a through FIG. 1c are scanning electron micrographs showing silica particles with a coating of nanoparticulate $TiO_2$ at 4% by wt. silica according to the above process. FIGS. 2a through FIG. 2d, are similar scanning electron micrographs of silica particles with a coating of nanoparticulate $TiO_2$ at 0.5% by wt. silica according to the above process.

Figure 3A:
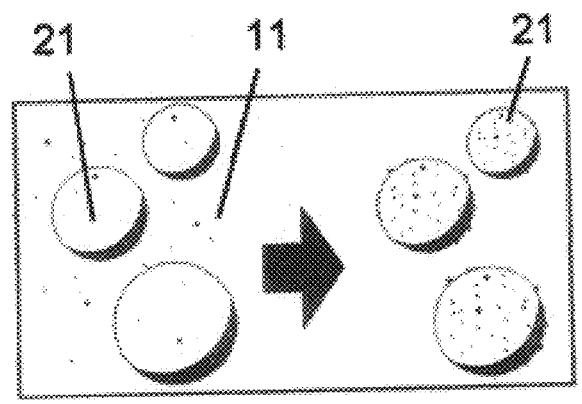
FIG. 3a shows discrete particles of titanium oxide partially covering larger extender particles.
Figure 3B:
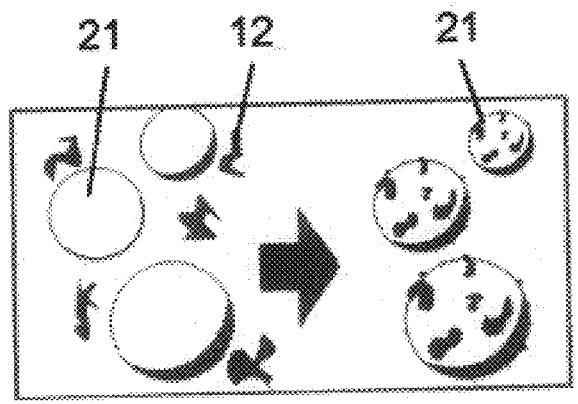
FIG. 3b shows discrete flocculates of titanium oxide particles partially covering extender particles.
Figure 3C:
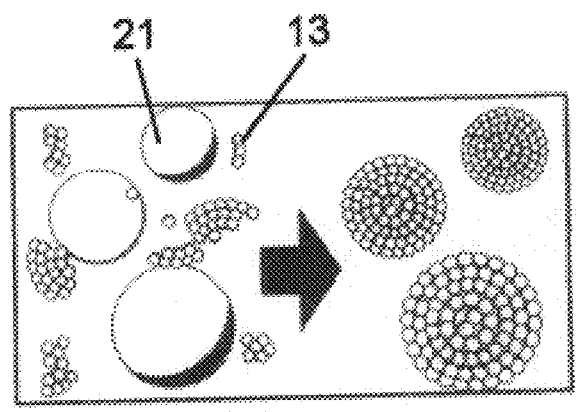
FIG. 3c shows discrete titanium oxide particles fully covering larger extender particles.

A perhaps more understandable view of an entire surface coating of nano-particulate $TiO_2$ in accordance with the above process of the present invention is within the graphical depiction of FIG. 3. FIG. 3 diagrammatically shows three example arrangements of discrete photocatalytic particles, particularly titanium dioxide particles, on the surface of an extender, or carrier, or core particle so as to form a photoactive antifouling aggregate. FIG. 3a shows in the direction of the arrow the accumulation of discrete particles 11 of titanium oxide—by action of a sol coating—so as to partially cover larger extender particles 21. FIG. 3b shows in the direction of the arrow the accumulation of irregularly-shaped discrete flocculates 12 of titanium dioxide particles—again by action of a sol coating—so as to partially cover extender particles 21. Finally, FIG. 3c shows agglomerations 13 of discrete titanium dioxide particles 11 to fully cover the larger extender particles 21. When it is remembered that even the smallest titanium dioxide particles—the discrete particles 11 of FIG. 3a—contain many molecules of $TiO_2$, normally more than one hundred, it is clear that the titanium dioxide is agglomerated as nanoparticles, or spots, or islands. Particularly obvious in FIGS. 3a and 3c—but, technically, also in FIG. 3c—the coating is not even, and is not uniform.

1.2 Example of the Application of a Nanoparticulate Titanium Dioxide Coating, Particularly to Silicon Powder An example of the process of the invention for the application of a nanoparticulate titanium dioxide coating is as follows. The example is for the application of nanoparticulate TiO2 coating to silica powder.

Additional required chemicals include (vi) Min-U-Sil 5 Silica, U.S. Silica.

Figure 4:
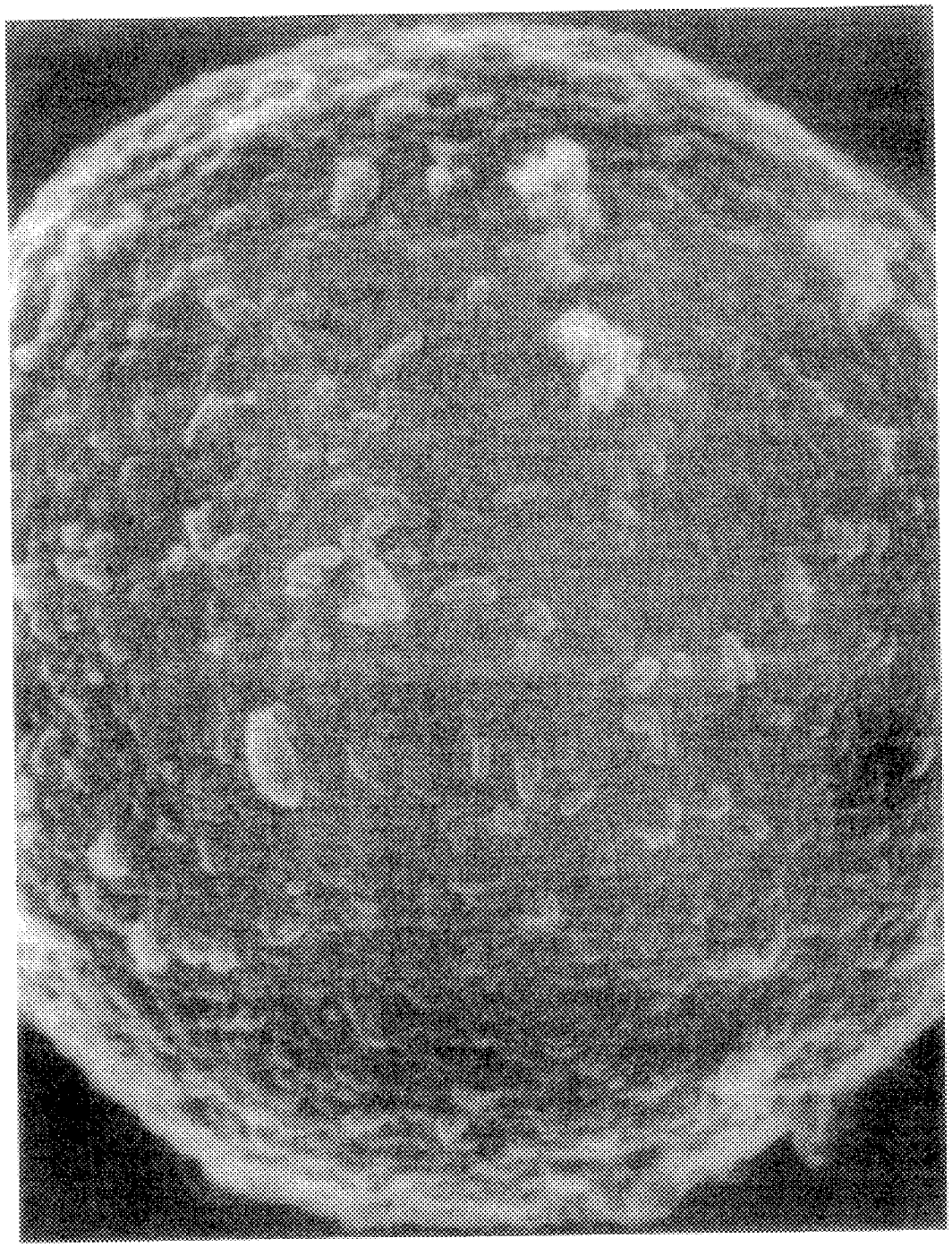
FIG. 4 is a transmission electron micrograph of a composite photocatalytic particle having substantially discrete particles of anatase titanium dioxide dispersed on the surface of a silica particle created using a compaction milling device.

2.5 ml of HCl 0.15 M is mixed with 5 g silica powder (Minucel 5 from U.S. Silica, avg. particle size 1.4 microns) to create a slurry. 2.22 g titania sol from Example 1 is then added to the slurry. 10 ml $NH_4OH$ 0.1 M is then stirred into the titania-coated silica slurry to neutralize it to pH 7. The resulting slurry is then filtered, re-suspended in 25 ml water to rinse, and then filtered again. The resulting cake is then dried at 130° C. for 30 minutes and then annealed at 650° C. for 4.5 hours. The resulting powder is silica coated with approximately 1%by weight nanoparticulate $TiO_2$. The powder is photocatalytic which may be measured by the decolorization of the textile dye Reactive Black 5 as described in I. Arslanin's "Degradation of commercial reactive dyestuffs by heterogenous and homogenous advanced oxidation processes: a comparative study" *Dyes and Pigments* 43 (1999) 95–108. Examination of the powder using scanning electron microscopy demonstrates a well-dispersed coating of nanoparticulate $TiO_2$ having particle sizes of about 1 nm to 100 nm adhering to the silica particles. For example, see FIG. 4 which is a transmission electron micrograph of a composite photocatalytic particle having substantially discrete particles of anatase titanium dioxide dispersed on the surface of a silica particle created using a compaction milling device.

1.3 Example of the Process of Scaling-Up for the Production of Composite Photocatalytic Particles Containing Nanoparticulate Titanium Dioxide Upon Their Surface An example of the process of the invention for scaling-up the production of composite photocatalytic particles containing nanoparticulate titanium dioxide upon their surface is as follows:

Scaling up this process for making composite photocatalytic particles containing nanoparticulate titanium dioxide upon their surface (hereinafter called Catalytic Power) requires that the process be made volume efficient, and thus cost efficient. To do so, washing steps can be modified from a single step into several steps of smaller charges with intermediate filtering. The main point is to wash the slurry to remove salts and other contaminants. This can be broken into smaller washings as necessary.

Filtering the material from the 6 M HCl creates 2 potential problems: The first is to find large-scale corrosion resistant filtering equipment with the necessary personal safety considerations. The second is how to handle the waste stream. Typically, in industrial processes, waste streams are neutralized before going down the sewer so when it hits the waste treatment plant, they have only small pH adjustments to make and it has minimal impact on the "bugs".

To address this problem, an alternative to filtering is to use a settling tank wherein settled material is drawn from the bottom of the tank. The time for settling is variously between 12 hours and 36 hours, and most often overnight. It is also possible to reuse a portion of the HCl (perhaps 50–90% of it) to reduce the waste stream.

Additionally, in order to minimize the time on the HCl filtration step (where the small particle size leads to long filtration times), one could use an idea analogous to affinity chromatography. One fills a column with glass beads and pours the acidic suspension of titania down through it. For small enough beads and a long enough column, the titania would filter out and stick to the beads. A pressure gradient through the column would assist the separation. Once the liquid has passed through, the beads would then be emptied into a container and tumbled with water to create the desired sol. The beads would then be removed through a coarse filter, left to dry, and then reused for the next separation. The column itself could be coated with teflon to minimize sticking of titania.

It has been found that dilute sols (around 1% $TiO_2$) lead to greater photocatalytic activity on the coated silica than more concentrated sols (around 2.3% $TiO_2$). The trade off is in manufacturing cost (the amount of waste water generated). A variant of this method adds a dispersant to the acidic titania sol in order to improve the distribution of the nanoparticulates on the core particles. Indeed, the reason the more dilute sols seem to increase photocatalytic activity (see the next section 2.) may be due to better distribution of the nanoparticulates on the core particles.

The desired % of water in the final filter cake (5% $TiO_2$ on Silica) prior to drying is typically 30% +−7%. The variance is caused by variability in filtration times and pressure gradient across the filter media: more filtration time or greater gradient makes the cake drier, less filtration time or less gradient, wetter. Less moisture is desirable to minimize energy costs from drying.

The annealing phase of the process may also be optimized for economic benefit. Annealing time need be no longer, and temperature no higher, than required to achieve satisfactory photocatalytic activity in the finished Catalytic Powders.

2. Composite Photocatalytic Particles

It will be recalled that the present invention has separate, and severable, aspects relating to composite photocatalytic particles comprised of a particle core with substantially discrete photocatalytic particles dispersed onto the surface of the particle core. Suitable core particles include silicate and carbonate sands and powders, inorganic pigments, mineral and mineral composites, construction aggregates including roofing granules, polymeric granules and mixtures thereof. The photocatalytic particles have an average diameter size within the range of about 1 nm to 100 nm and are dispersed on the surfaces of the core particles in an amount of less than 20 wt. % based on total particle weight. The scope of the present invention also includes building materials containing these composite photocatalytic particles and processes for making these composite particles.

2.1 Preparation of Composite Photocatalytic Particles

The core particles used to make the composite photocatalytic particles of the present invention can be varied. They may be rounded, polyhedral, or irregular shaped and produced through mining, crushing of aggregates, or a manufacturing process for making polymeric granules or composite polymeric and mineral-based granules, such as roofing granules. Preferably, the core particles do not interfere with the photocatalytic action of the composite particle and do not adversely interact with other components in an end-use application. One important aspect is the size of the core particle. It is desirable that the core particle be larger than the photocatalyst particles. Typically, the average size of the core particle is within the range of 100 nanometers to 1 centimeter in diameter, the size being determined by the end-use of the composite photocatalytic particle.

Examples of core particles include, but are not limited to polymer granules and powders such as: acrylics, acrylonitriles, acrylamides, butenes, epoxies, fluoropolymers, melamines, methacrylates, nylons, phenolics, polyamids, polyamines, polyesters, polyethylenes, polypropylenes, polysulfides, polyurethanes, silicones, styrenes, terephthalates, vinyls; and inorganic particles of the following, including those in hydrated form: oxides of silicon, titanium, zirconium, zinc, magnesium, tungsten, iron, aluminum, yttrium, antimony, cerium, and tin; sulfates of barium and calcium; sulfides of zinc; carbonates of zinc, calcium, magnesium, lead and mixed metals, such as naturally occurring dolomite which is a carbonate of calcium and magnesium, $CaMg(CO_3)_2$; nitrides of aluminum; phosphates of aluminum, calcium, magnesium, zinc, and cerium; titanates of magnesium, calcium, strontium, and aluminum; fluorides of magnesium and calcium; silicates of zinc, zirconium, calcium, barium, magnesium, mixed alkaline earths and naturally occurring silicate minerals and the like; aluminosilicates of alkali and alkaline earths, and naturally occurring aluminosilicates and the like; aluminates of zinc, calcium, magnesium, and mixed alkaline earths; hydroxides of aluminum, diamond; feldspars; or the like and above mixtures or composites thereof. As used herein, mixtures refer to a physical mixture of core particles containing more than one type of particulate form. As used herein, composites refer to intimate combinations of two or more core materials in a single particle, such as an alloy, or any other combination wherein at least two distinct materials are present in an aggregate particle.

The photocatalyst particles used to make the composite particles of this invention can be varied. Typically, the average size of the photocatalyst particle is within the range of 1 nanometer to 100 nanometers, preferably about 1 nanometer to 50 nanometers, and more preferably about 1 nanometers to 10 nanometers. In accordance with the present invention, the photocatalyst particles form a non-continuous coating of a discrete particulate form and can be observed and measured by electron microscopy such as transmission electron microscopy.

The photocatalytic particles used to coat the surfaces of the core particles include one or a combination of two or more of known metal compound semiconductors such as titanium oxides, zinc oxides, tungsten oxides, iron oxides, strontium titanates, and the like. Particularly titanium oxides which have a high photocatalytic function, a high chemical stability and no toxicity is preferred. In addition, it is preferred to include inside said photocatalyst particles and/or on the surfaces thereof at least one metal and/or a compound thereof selected from the group consisting of V, Fe, Co, Ni, Cu, Zn, Ru, Rh, Si, Sn, Pd, Ag, Pt and Au as a second component because of the higher photocatalytic function of the resulting photocatalyst particles. The aforementioned metal compounds include, for example, metal oxides, hydroxides, oxyhydroxides, sulfates, halides, nitrates, and even metal ions. The content of the second component may vary depending upon the kind thereof. Preferred photocatalyst particles which may contain the aforementioned metals and/or metal compounds are of titanium oxide.

Preferred photocatalyst particles are anatase titanium dioxide, zinc oxide, tungsten trioxide, and the above mixtures or composites thereof. More preferred photocatalyst particles are mixtures, composites, or alloys of the above oxides with silica dioxides and tin oxides.

The amount and size of photocatalyst particles will influence the surface area and thus impact the oil absorption of the final composite particle, as described hereinbelow. For example, larger size photocatalyst particles within the above prescribed ranges and/or fewer photocatalyst particles can be used to minimize oil absorption. Typically, the amount of photocatalyst particles is less than about 20 weight %, based on the total weight of the composite particle, preferably less than about 10 weight %, and more preferably less than about 6 weight %. The shape of the photocatalyst particles can be spherical, equiaxial, rod-like or platelet. Preferably, the photocatalytic particle is equiaxial or spherical to minimize oil absorption.

It is desirable to have a substantially uniform distribution of the photocatalyst particles on the surfaces of the core particles. The photocatalyst particles will be attracted to the core particle surfaces by van der Waals' forces and may be further anchored to the core particle surfaces by chemical bonding and/or by hydrous oxide bridges, if hydrous oxides are present on the core particles as a topcoat.

Aggregates or agglomerates of photocatalyst particles are preferably broken down to primary particles to maximize surface area of the photocatalyst and minimize the amount of photocatalyst used. Aggregates are distinguished from agglomerates in that aggregates are held together by strong bonds such as fusion bonds and cannot be fragmented easily, while agglomerates are weakly bonded and can be broken up by high energy agitation.

The composite photocatalyst particles of this invention can be prepared by a variety of processes. In one process, an aqueous slurry of core particles is prepared. A colloidal suspension of photocatalyst particles, i.e., a sol is added to the aqueous core particle slurry with sufficient mixing. Mixing can be carried out by any suitable means at a ratio of core particles to photocatalytic particles which achieves the desired weight % of discrete particles in the final composite particle product. "Sol" is defined herein as a stable dispersion of colloidal particles in a liquid containing about 0.1 to 60% by weight photocatalyst particles as a dispersion in a liquid typically water. "Colloidal" is used herein to refer to a suspension of small particles which are substantially individual or monomeric particles and small enough that they do not settle. For purposes of this invention, it is important that the average size of the photocatalytic particles in the colloidal suspension (i.e., sol) be within the range of about 1 to about 100 nm (0.001–0.1 microns) in diameter, preferably about 1 to about 50 nm (0.001–0.05 microns), and more preferably about 1 to about 10 nm (0.001–0.01 microns). These photocatalytic particles sizes are generally the same sizes in the final composite particle product. It is preferred that the colloidal suspension be at the highest solids concentration at which the suspension is stable, typically about 14 to 50 wt. % solids. These colloidal suspensions (sols) can be prepared as known in the art, such as described in Yasuyuki Hamasaki's "Photoelectrochemical Properties of Anatase and Rutile Films Prepared by the Sol-Gel Method," 1994, J. Electrochem. Soc. Vol. 141, No. 3 pp 660–663 and Byung-Kwan Kim's "Preparation of TiO2-SiO2 powder by modified sol-gel method and their photocatalytic activities," 1996, Kongop Hwahak, 7(6), pp 1034–1042.

It has been found that both the particles in the core particle slurry and the photocatalyst particles in the colloidal suspension should be preferably both above or both below their respective isoelectric points to achieve a substantially uniform surface coating. The "isoelectric point" is used herein to refer to the pH at which particles have a neutral net charge. The core particles in the slurry and the photocatalyst particles in the colloidal suspension may also have opposite charges. Additionally, if the mixture of core particle slurry and colloidal photocatalyst particles have low ionic strength and the pH is such that both the core particles and the photocatalyst particles are both above or below their isoelectric points, then it is useful to adjust the pH of the mixture so that either the core particles or the photocatalyst particles approach their respective isoelectric points. This additional pH adjustment will generally be necessary whenever the ionic strength of the mixture is low.

Alternatively, core particles may be combined with a reaction mixture which is a precursor for forming a colloidal suspension of photocatalyst particles. The nano-size photocatalyst particles are then formed in the presence of the core particles and deposit onto the core particles. For example, reference U.S. Pat. No. 5,840,111 wherein a precursor solution comprising sulfuric acid and titanyl sulfate is combined at elevated temperature to an alkaline-reacting liquid until the resultant mixture reacts acidically and forms titanium dioxide nanoparticles.

Optionally, photocatalyst particles may be adhered to the core particle by a hydrous oxide bridge. Such hydrous oxides are silica, alumina, zirconia, and the like. In this process, a dry mix of core particles containing one or more soluble forms of silica, alumina, zirconia, and the like, such as sodium silicate, potassium silicate and sodium aluminate, are combined with an acidic colloidal suspension of photocatalyst. Suitable acids include HCl, $H_2SO_4$, $HNO_3$, $H_3PO_4$ or the like. Alternatively, an alkali colloidal suspension of photocatalyst may be used in which case the core particles contain aluminum sulfate, aluminum chloride or other alkali-neutralized soluble forms of silica, alumina, zirconia, and the like. Suitable bases include NaOH and KOH. Core particles are added to the colloidal suspension with high shear mixing. In carrying out the mixing, a high shear mixer such as a Waring blender, homogenizer, serrated disc type agitator or the like can be used. Specific speed characteristics depend on equipment, blade configuration, size, etc., but can be determined readily by one skilled in the art. The total solids content (i.e., core and photocatalyst particles) of the resulting slurry is above about 25% by weight, and above 50% by weight is preferred. The resulting slurry is then dried.

Optionally, photocatalyst particles may be adhered to the core particle by a calcium oxide bridge. In this process, a dry mix of core particles containing Portland cement, or other similar cement, in the particle is combined with an acidic colloidal suspension of photocatalyst. Mixing may be accomplished with a rotary cement mixer as used by building contractors in the field. The total solids content (i.e., core and photocatalyst particles) of the resulting slurry is above about 25% by weight, and above 50% by weight is preferred. The resulting slurry may then be dried or used directly as the wet aggregate component for addition to cement or concrete mixes as known in the art.

An alternative method of carrying out the invention is forming an aqueous mixture by combining water with the colloidal suspension of photocatalyst particles as described above in the presence of at least one dispersant. The dispersant can be either added simultaneously with the water or subsequently to the addition of photocatalyst particles. The dispersant can be selected from those described in U.S. Pat. No. 5,393,510, the teachings of which are incorporated herein by reference. Examples of dispersants include alcohol amines such as 2-amino-2-methyl-1-propanol, 2,2',2"-nitrilotrisethanol, 2,2'-iminobisethanol, 2-aminoethanol and the like, and 1-amino-2-propanol, polyacrylates, citric acid and tetrapotassium pyrophosphate (TKPP) and the like. Typically a combination of the above dispersants is preferred in an amount of about 0.05 to about 5% based on the core particle weight. The concentration of photocatalyst particles in the colloidal suspension is from about 0.1 to 60 weight % preferably about 14 to 50 wt %. It is preferable that the photocatalyst colloidal particles be well dispersed and not in an aggregate or flocculated form. As described above, both positive or both negative charges of the photocatalyst particles in the colloidal suspension and the core particles are preferred to achieve a substantially uniform surface coating. Core particles are added to this aqueous mixture with high shear mixing as described above. The total solids content (i.e., core and photocatalyst particles) of the resulting slurry is above about 25% by weight, and above 50% by weight is preferred.

The conventional finishing steps such as filtering, washing, and drying the composite photocatalyst particles are known and are subsequently carried out. The resulting product is a dry, finished composite photocatalyst particle which is useful for end-use applications and/or can be used to prepare a slurry useful for end-use applications. For example, slurries of silica or carbonate sands coated with photocatalyst particles can be combined with Portland cement, or other similar cement, for preparing stucco as known in the art.

The resulting composite photocatalyst particles of this invention are suitable for use as aggregates and fillers for creating microbe-resistant building products. For example, building products that may use composite particles of this invention include stucco, precast concrete, structural cement, swimming pool cement, cementatious coatings, grout, roofing shingles, textured and abrasion resistant coatings, and other building products. The enhanced microbe resistance is demonstrated under conditions where light is present.

To give a clearer understanding of the invention, the following Examples are construed as illustrative and not limitative of the underlying principles of the invention in any way whatsoever.

2.2 First Example of A Composite Photocatalytic Particle

A pure strain of green algae was inoculated into liquid growth media with 5% by weight 1.4 micron average diameter silica powder (the control) and also into identical media mixed with 5% by weight silica powder coated with 5% by weight nanoparticulate anatase titanium dioxide. The composite photocatalytic particle was prepared using the method detailed in Comparative Example 1.2. The mixtures were placed in two stirred flasks and exposed for three days under cool white fluorescent light at 450 foot-candles. The amount of algae growth in each flask was then measured using absorbance normalized at 480 nm. Normalized on a 0 to 1 scale, absorbance at 480 nm averaged 0.08 for the media containing photocatalytic powder verses 1 for the media containing regular powder.

Figure 5:
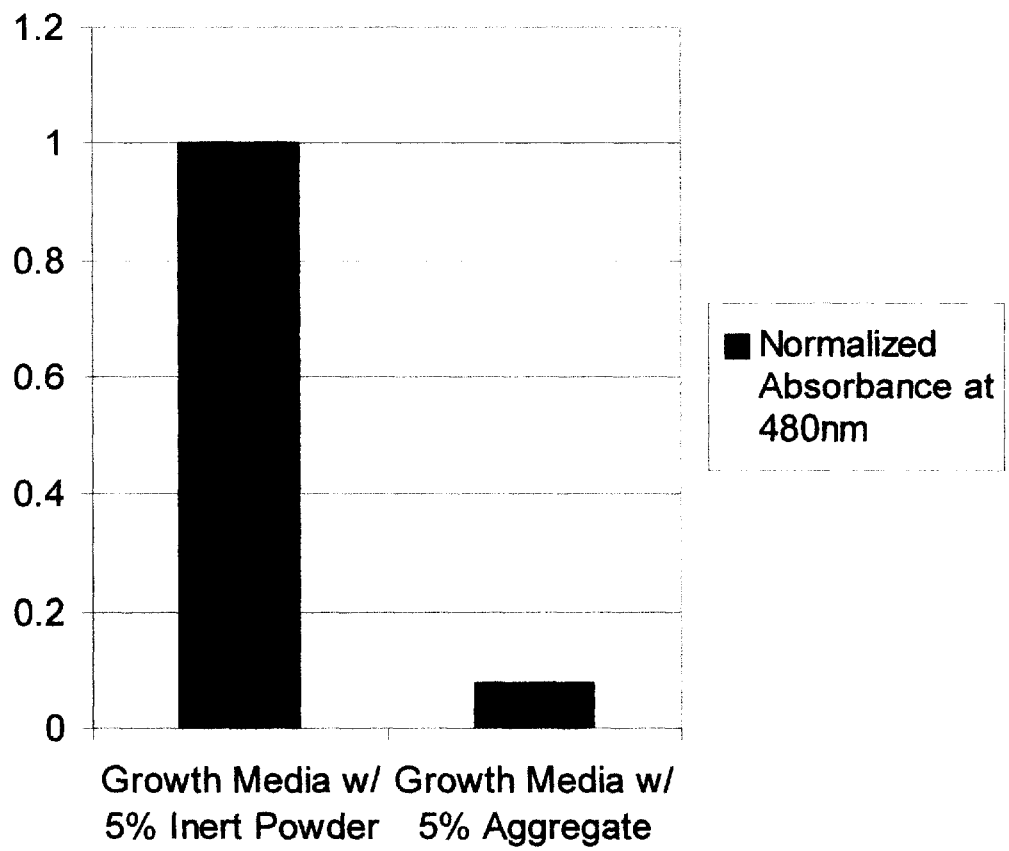
FIG. 5 is a bar chart illustrating the algae-inhibiting effect of photoactive antifouling aggregate comprising 25 weight % non-colloidal photoactive zinc oxide and 75 weight % colloidal anatase titanium dioxide.

A bar chart illustrating the algae-inhibiting effect of photoactive antifouling aggregate comprising 25 weight % noncolloidal photoactive zinc oxide and 75 weight % colloidal anatase titanium dioxide is shown in FIG. 5.

Figure 6:
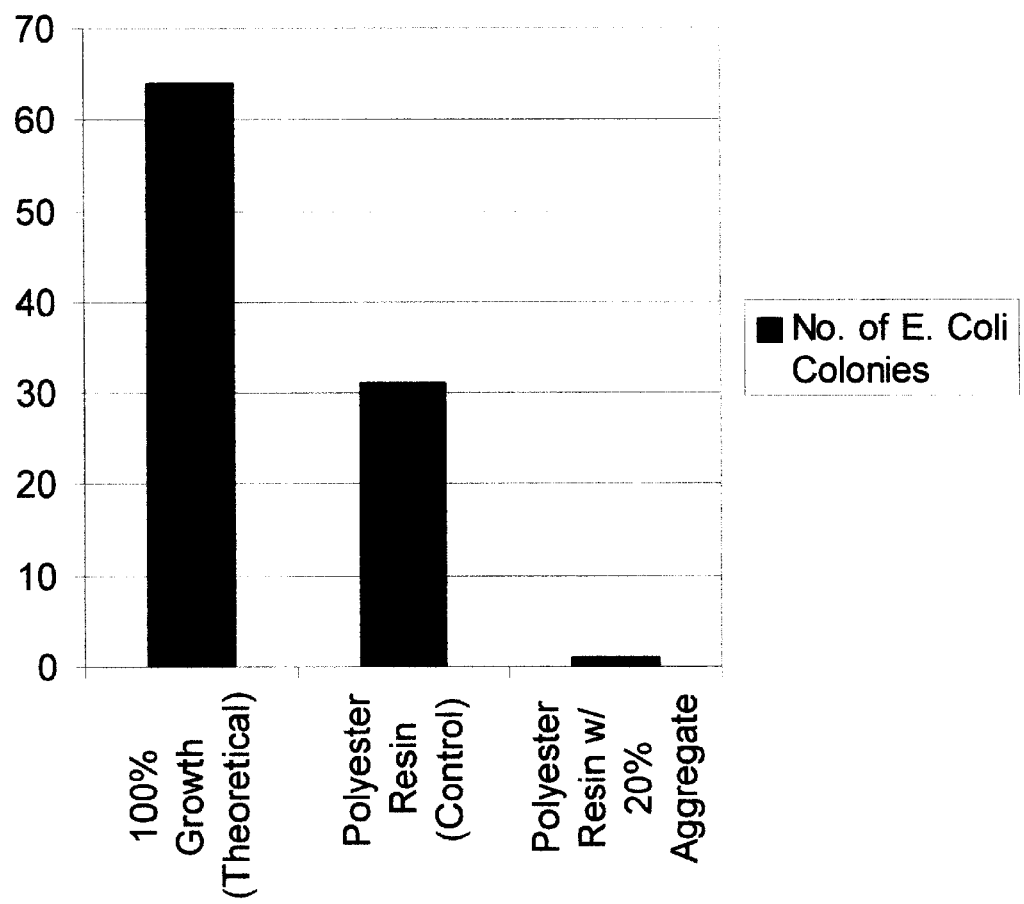
FIG. 6 is a bar chart showing the inhibiting effect of an the aggregate of FIG. 5 on the growth of *E. coli* bacteria.

A bar chart showing the inhibiting effect of an the aggregate of FIG. 5 on the growth of *E. coli* bacteria is shown in FIG. 6.

2.3 Second Example of A Composite Photocatalytic Particle

*E. coli* was inoculated onto a polyester resin coating mixed with 20% by weight solids 1.4 micron average diameter silica powder (the control) and also onto an identical coating mixed with 20% by weight solids silica powder prepared as in Comparative Example 2.2. After twenty-four hours of exposure under cool white fluorescent light at 450 foot-candles, the polyester films were imprinted onto agar plates and the agar left to colonize over 12 hours. The number of colonies that grew on the agar plates were then counted. Normalized on a 0 to 1 scale, the number of *E. coli* colonies observed averaged 0.03 for the treated polyester resin versus 1 for the untreated resin.

3.0 Photocatalytic Aggregates

The extender particles used to make the composite aggregate particles of this invention can be varied. They may be rounded, polyhedral, or irregular shaped and produced through mining, grinding of minerals, or synthetic methods. Preferably, the extender particles do not interfere with the photocatalytic action of the composite aggregate and do not adversely interact with other components in an end-use application. One important aspect is the size of the extender particle. It is desirable that the extender particle have an average size of 100 nanometers to 1 centimeter and that the extender particle be larger than the photocatalyst particles.

Examples of extender particles include, but are not limited to inorganic particles of the following, including those in hydrated form: oxides of silicon, titanium, zirconium, zinc, magnesium, tungsten, iron, aluminum, yttrium, antimony, cerium, and tin; sulfates of barium and calcium; sulfides of zinc; carbonates of zinc, calcium, magnesium, lead and mixed metals, such as naturally occurring dolomite which is a carbonate of calcium and magnesium, $CaMg(CO_3)_2$; nitrides of aluminum; phosphates of aluminum, calcium, magnesium, zinc, and cerium; titanates of magnesium, strontium, calcium, and aluminum; fluorides of magnesium and calcium; silicates of zinc, zirconium, calcium, barium, magnesium, mixed alkaline earths and naturally occurring silicate minerals and the like; aluminosilicates of alkali and alkaline earths, and naturally occurring aluminosilicates and the like; aluminates of zinc, calcium, magnesium, and mixed alkaline earths; hydroxides of aluminum, diamond; feldspars; natural and synthetic clays; wollastonite; or the like and above mixtures or composites thereof. As used herein, mixtures refer to a physical mixture of extender particles containing more than one type of extender material form. As used herein, composites refer to intimate combinations of two or more extender materials in a single extender particle, such as an alloy, or any other combination wherein at least two distinct materials are present in an aggregate extender particle.

The photocatalytic titanium oxide is exposed on the surface of the extender particle in the form of discrete particles. The discrete particles may form small agglomerates, such as flocculated particles, on the surface of the aggregate particle, but this is less desirable because some discrete particles will then be shaded. The discrete particles typically have an average size within the range of 1 nanometer to 100 nanometers, preferably about 1 nanometers to 50 nanometers, and more preferably about 1 nanometers to 10 nanometers. The discrete particles can be observed and measured by electron microscopy such as scanning electron microscopy.

The photocatalyst used to make the composite aggregate particles of this invention are titanium oxides which have a high photocatalytic function, a high chemical stability and no toxicity. More particularly preferred is the anatase crystalline form of titanium dioxide.

It is desirable to have a substantially uniform, although not necessarily continuous, distribution of discrete photocatalyst particles on the surfaces of the aggregate particles. Typically, the amount of photocatalyst is less than 20 weight % based on the total weight of the aggregate material, preferably less than 10 weight %, and more preferably less than 6 weight %.

The photocatalyst material will be attracted to the extender particle surfaces by van der Waals' forces and may be further anchored to the extender material surfaces by stronger chemical bonds such as fusion bonds. It has been found that flocculation of photocatalyst particles reduces photocatalytic efficiency, likely due to optical crowding effects, and is generally undesirable.

The aggregates of this invention generally disperse easily in aqueous and solvent-based slurries, coatings, and solutions. Unlike virgin photocatalyst, dispersion does not generally require the use of chemical dispersing aides or aggressive agitation or milling.

3.1 Preparation of Photoactive Antifoulant Aggregates

The photoactive antifoulant aggregates of this invention can be prepared by a variety of processes. In one process, an aqueous slurry of extender particles is prepared. To this slurry is added, with sufficient mixing, a colloidal suspension, i.e. a sol, of titanium oxide particles. Mixing can be carried out by any suitable means at a ratio of extender particles to photocatalytic particles which achieves the desired weight % of premium photocatalyst in the final aggregate. "Sol" is defined herein as a stable dispersion of colloidal particles in a liquid containing about 0.1 to 60% by weight particles as a dispersion in a liquid typically water. "Colloidal" is used herein to refer to a suspension of small particles which are substantially individual or monomeric particles and small enough that they do not settle. The photocatalyst particle sizes are generally the same sizes at the start of the process as in the final aggregate particle product. It is preferred that the colloidal suspensions of photocatalyst be at the highest solids concentration at which the suspension is-stable, typically about 14 to 50 weight % solids. These colloidal suspensions (sols) can be prepared as known in the art, such as described in U.S. Pat. No. 5,840,111; Yasuyuki Hamasaki's "Photoelectrochemical properties of anatase and rutile films prepared by the sol-gel method," 1994, *J. Electrochem. Soc.* Vol. 141, No. 3 pp 660–663; and/or Byung-Kwan Kim's "Preparation of TiO2-SiO2 powder by modified sol-gel method and their photocatalytic activities," 1996, *Kongop Hwahak*, 7(6), pp 1034–1042.

It has been found that the particles in the extender particle slurry and the photocatalyst particles in the colloidal suspension should both be preferably above or below their respective isoelectric points to achieve a substantially uniform surface coating of the smaller colloidal particles on the larger slurry particles. The "isoelectric point" is used herein to refer to the pH at which particles have a neutral net charge. The particles in slurry form and the particles in colloidal suspension may also have opposite charges. Additionally, if the mixture of slurry and colloidal particles have low ionic strength and the pH is such that the extender particles and photocatalyst particles are both above or below their isoelectric points, then it is useful to adjust the pH of the mixture so that one of the particles approaches its isoelectric point. This additional pH adjustment will generally be necessary whenever the ionic strength of the mixture is low.

In applications in which acid excesses have a disruptive effect, the colloidal suspensions according to the invention may subsequently be stabilized in the neutral pH range in a manner known in principle, for example with acetylacetone (see, e.g., WO-93/05875) or with hydroxycarboxylic acids (see, e.g., EP-A518 175).

In an alternative preparation process, extender particles may be added to a-solution containing a soluble form of a titanium oxide precursor and then an acid or base added to reactively coat the extender particles in situ with discrete photocatalyst particles to make the aggregate particles of this invention. For example, in U.S. Pat. No. 5,840,111 Wiederhoft describes a precursor solution comprising sulfuric acid and titanyl sulfate. Extender particles may be added to this precursor solution and then an alkaline-reacting liquid added, with sufficient mixing, until the resultant mixture reacts acidically and forms a coating of discrete titanium dioxide particles on the extender particles.

The conventional finishing steps such as filtering, washing, drying and grinding the aggregate antifouling product are known and are subsequently carried out. The resulting product is a dry, finished aggregate photocatalyst particle which is useful for end-use applications and/or can be used to prepare a slurry useful for end-use applications. Methods of preparing particulate slurries are known in the art, for example, as described in Canadian Patent 935,255.

Alternatively, titanium oxide particles may be adhered to the extender particle by stronger chemical bonds such as fusion bonds. In one embodiment of this process, a dry mix of extender particles containing one or more soluble forms of silica, alumina, zirconia, and the like, such as sodium silicate, potassium silicate and sodium aluminate, are combined with an acidic colloidal suspension of photocatalyst, such as the titania sol described earlier. Suitable acids include HCl, $H_2SO_4$, $HNO_3$, $H_3PO_4$ or the like. Alternatively, a basic colloidal suspension of photocatalyst may be used in which case the extender particles contain aluminum sulfate, aluminum chloride or other base neutralized soluble forms of silica, alumina, zirconia, and the like. Suitable bases include NaOH and KOH. Extender particles are added to the colloidal suspension with sufficient mixing. The total solids content (i.e., extender and titanium oxide particles) of the resulting slurry is above about 25% by weight, and above 50% by weight is preferred.

An alternative method of carrying out the invention is forming an aqueous mixture by combining water with the colloidal suspension of titanium oxide in the presence of at least one dispersant. The dispersant can be either added simultaneously with the water or subsequently to the addition of titanium oxide particles. The dispersant can be selected from those described in U.S. Pat. No. 5,393,510, the teachings of which are incorporated herein by reference. Examples of dispersants include alcohol amines such as 2-amino-2-methyl-1-propanol, 2,2',2"-nitrilotrisethanol, 2,2'-iminobisethanol, 2-aminoethanol and the like, and 1-amino-2-propanol, polyacrylates, citric acid and tetrapotassium pyrophosphate (TKPP) and the like. Typically a combination of the above dispersants is preferred in an amount of about 0.05 to about 5% based on the aggregate particle weight. The concentration of particles in colloidal suspension is from about 0.1 to 60 weight %, preferably about 14 to 50 weight %, and in slurry form above 25 weight %, and above 50 weight % preferred. It is preferable that the particles be well dispersed and not in an aggregate or flocculated form. As described above, all positive or all negative charges of the titanium oxide particles and the extender particles are preferred to achieve a substantially uniform surface coating. Extender particles are added to this aqueous mixture with high shear mixing or milling as described in greater detail in Canadian Patent 935,255, U.S. Pat. Nos. 3,702,773 and 4,177,081, the teachings of which U.S. patents are incorporated herein by reference. In carrying out the mixing, a high shear mixer or mill such as a Waring™ blender, homogenizer, serrated disc type agitator, ball mill, sand mill, disc mill, pearl mill, high speed impeller mill or the like can be used. (Waring™ is a registered trademark of the Waring Corporation.) Specific speed characteristics depend on equipment, blade configuration, size, etc., but can be determined readily by one skilled in the art.

The total solids content (i.e., extender and photocatalyst particles) of the resulting slurry is above about 25% by weight, and above 50% by weight is preferred.

3.2 Action of the Antifouling Aggregates So Produced

The resulting improved photoactive antifoulant aggregate products of this invention are suitable for use in coatings and building products, for example, in antifoulant coatings, stucco, swimming pool cement, grout, concrete, wall shingles, hard flooring, and roofing granules. The antifouling activity is best demonstrated in products where the surface concentration of exposed photoactive aggregate is greater than 1%, preferably greater than 5%, and more preferably greater than 10%. Surface concentration is expressed as a percentage and represents the volume of the photoactive aggregate at the active surface divided by the sum of the volumes of the photoactive aggregate at the active surface and the carrier at the active surface. Antifouling activity is observed only when U.V. or visible light is present to expose the photoactive aggregate. Photoactive aggregate present in the body of the coating or building product but not exposed at the surface does not contribute to antifouling activity. Polymeric binders subject to photocatalytic attack, such as acrylic and polyester resin, chalk over time from contact with the photoactive aggregates of this invention in the presence of U.V. or visible light. Photocatalytic chalking from photoactive pigments is well known in the painting industry, and such chalking exposes pigment particles in the paint. In the present invention, chalking exposes more antifouling aggregate and thus improves the antifouling activity of the coating. Where chalking is undesirable in the coating, alternative resins may be employed such as silicones and fluoropolymers as described in further detail in U.S. Pat. Nos. 5,547,823 and 5,616,532, the teachings of which are incorporated herein by reference.

In accordance with the preceding explanation, variations and adaptations of the method of producing and of using a nanoparticulate titanium dioxide coating in accordance with the present invention will suggest themselves to a practitioner of the chemical arts.

In accordance with these and other possible variations and adaptations of the present invention, the scope of the invention should be determined in accordance with the following claims, only, and not solely in accordance with that embodiment within which the invention has been taught.

What is claimed is:

1. A process of producing a sol of particulate titanium dioxide comprising:
    a) mixing an alkaline-reacting liquid with an aqueous solution of titanyl sulphate at elevated temperature until the resultant mixture reacts acidically and is neutralized to a pH between 5 and 9, forming flocculates of titanium dioxide nanoparticles;
    b) first-isolating the formed titanium dioxide nanoparticle flocculate;
    c) first-washing in water the isolated titanium dioxide nanoparticle flocculate;
    d) second-washing in an acid or an alkali the first-isolated and first-washed nanoparticle flocculate,
    e) second-isolating as a product of the second-washing an acidic or an alkaline titania concentrate of titanium dioxide; and
    f) dispersing the second-isolated titania concentrate in a polar sol-forming medium to make a sol suitable to serve as a coating in which sol is present particulate titanium dioxide.

2. The process of producing both (i) particulate titanium d oxide and (ii) a sol of particulate titanium dioxide according to claim 1 wherein the a) mixing through f) dispersing makes a sol that is transparent.

3. The process according to claim 1 wherein the f) dispersing of the second-isolated titania concentrate in a polar sol-forming medium is so to make a transparent sol in which $TiO_2$ is present exclusively as nano-particles having a diameter of between 1 and 100 nm.

4. The process according to claim 1 wherein the f) dispersing of the second-isolated titania concentrate is in a polar sol-forming medium consisting essentially of water, or an alcohol containing 1 to 10 carbon atoms and at least one hydroxide group per molecule, or mixtures thereof.

* * * * *